(12) United States Patent
Kanai et al.

(10) Patent No.: US 6,985,994 B2
(45) Date of Patent: Jan. 10, 2006

(54) STORAGE CONTROL APPARATUS AND METHOD THEREOF

(75) Inventors: Hiroki Kanai, Odawara (JP); Shoji Kato, Odawara (JP); Yuusuke Yauchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/773,345

(22) Filed: Feb. 9, 2004

(65) Prior Publication Data

US 2005/0108472 A1    May 19, 2005

(30) Foreign Application Priority Data

Nov. 14, 2003  (JP)  ............................. 2003-385033

(51) Int. Cl.
    *G06F 12/00*  (2006.01)
(52) U.S. Cl. .................. 711/111; 711/113; 711/114; 711/130; 711/150; 711/162; 709/213
(58) Field of Classification Search ................ 711/111, 711/113, 114, 130, 150, 162; 709/213
    See application file for complete search history.

(56) References Cited

U.S. PATENT DOCUMENTS

| | | | | |
|---|---|---|---|---|
| 4,654,778 A | | 3/1987 | Chiesa et al. ................ 364/200 |
| 4,683,533 A | * | 7/1987 | Shiozaki et al. ............. 709/213 |
| 5,742,792 A | * | 4/1998 | Yanai et al. .................. 711/162 |
| 5,809,335 A | | 9/1998 | Kamiya ....................... 395/842 |
| 5,860,026 A | | 1/1999 | Kitta et al. ................... 710/33 |
| 6,430,642 B1 | | 8/2002 | Stracovsky et al. .......... 710/244 |
| 6,529,976 B1 | | 3/2003 | Fukuzawa et al. ............. 710/65 |
| 6,609,164 B1 | | 8/2003 | Kallat ........................... 710/22 |
| 6,631,443 B1 | | 10/2003 | Yamamoto et al. ........... 711/12 |
| 2002/0194435 A1 | * | 12/2002 | Yamagami et al. .......... 711/150 |
| 2003/0182516 A1 | | 9/2003 | Fujimoto ...................... 460/15 |
| 2003/0204649 A1 | | 10/2003 | Kanal et al. ............ 137/625.69 |
| 2003/0221077 A1 | | 11/2003 | Ohno et al. ................... 134/52 |
| 2004/0128453 A1 | | 7/2004 | Ido et al. ...................... 56/317 |

FOREIGN PATENT DOCUMENTS

GB    2353122    10/1999

* cited by examiner

*Primary Examiner*—Mano Padmanabhan
*Assistant Examiner*—Mardochee Chery
(74) *Attorney, Agent, or Firm*—Mattingly, Stanger, Malur & Brundidge, P.C.

(57) ABSTRACT

In a storage system having a first storage control apparatus and a second storage control apparatus, the first storage control apparatus has: a first memory; a second memory; an input/output control unit for data transfer information in the second memory; and a data transfer control unit having a data buffer and a data transfer register for controlling data transfer between the first memory and second storage control apparatus based on the data transfer information read from the second memory and written in the data transfer register. When a second data transfer is controlled while a first data transfer is controlled, the data transfer control unit writes the first data transfer information and data stored in the data buffer into the second memory, reads the second data transfer information from the second memory and writes the second data transfer information into the data transfer register to control the second data transfer.

15 Claims, 27 Drawing Sheets

FIG.12

PAIR MANAGEMENT TABLE 710

| PAIR TYPE | COPY TYPE | COPY SOURCE APPARATUS | COPY DESTINATION APPARATUS | COPY SOURCE VOLUME | COPY DESTINATION VOLUME | PAIR STATE |
|---|---|---|---|---|---|---|
| LOCAL | — | — | — | 0 | 2 | IN PAIR |
| LOCAL | — | — | — | 1 | 3 | IN PAIR |
| REMOTE | ASYNCHRONOUS | A | B | 0 | 0 | IN SPLIT |
| ⋮ | ⋮ | ⋮ | ⋮ | ⋮ | ⋮ | ⋮ |

| Port ID | WWN | LUN | Capacity (KB) | MAPPING LUN |
|---|---|---|---|---|
| 010001 | XXZZYYXX00002141 | 3 | 3,072 | 01:03 |
| 010006 | ad00bbffzz00a1ffd | 5 | 5,120 | 3B:20 |
| ⋮ | ⋮ | ⋮ | ⋮ | ⋮ |
| 032F31 | XXZZYYXX00002142 | 2 | 45,897 | 02:01 |

| HOST ID | PORT ID | LUN | ADDRESS | DATA LENGTH |
|---|---|---|---|---|

STORAGE CONTROL APPARATUS AND METHOD THEREOF

CROSS-REFERENCE TO RELATED APPLICATION

This application relates to and claims priority from Japanese Patent Application No. 2003-385033, filed on Nov. 14, 2003, the entire disclosure of which is incorporated herein by reference.

BACKGROUND OF THE INVENTION

1. Field of the Invention

The present invention relates to a storage control apparatus and a method of controlling storage control apparatuses.

2. Description of the Related Art

With the recent advance of information technologies, a remote copy realizing disaster recovery and the like are operated in which a plurality of storage apparatuses are interconnected to be able to communicate each other and the storage apparatus received a data input/output request from an information processing apparatus accesses data stored in another storage apparatus. This technique is disclosed, for example, in U.S. Pat. No. 5,742,792.

The data input/output performance at the other storage apparatus is restricted by the communications between two storage apparatuses.

SUMMARY OF THE INVENTION

The present invention has been made to solve this technical issue and the main object of the invention is to provide a storage control apparatus and a control method of controlling storage control apparatuses.

In order to solve this technical issue, the present invention provides a storage control apparatus in a storage system comprising a first storage control apparatus for receiving a data input/output request from an information processing apparatus and performing a data input/output process relative to a first storage volume for storing data and a second storage control apparatus connected to said first storage control apparatus in a communication enable state for performing a data input/output process relative to a second storage volume for storing data, wherein said first storage control apparatus comprises: a first memory for storing data transferred between said first storage control apparatus and said second storage control apparatus; a second memory; an input/output control unit for writing data transfer information in said second memory, said data transfer information containing a storage location of data in said first memory and a storage location of data in said second storage control apparatus; and a data transfer control unit having a data buffer for storing data and a data transfer register for storing said data transfer information, said data transfer control unit controlling data transfer between said first memory and said second storage control apparatus via said data buffer in accordance with said data transfer information read from said second memory and written in said data transfer register, and when a second data transfer based on second data transfer information is controlled while a first data transfer based on first data transfer information is controlled, said data transfer control unit writes said first data transfer information stored in said data transfer register and data stored in said data buffer into said second memory, reads said second data transfer information from said second memory, writes said second data transfer information in said data transfer register, and in accordance with said second data transfer information, controls said second data transfer.

Other issues disclosed in the present invention and their solution methods will become apparent from the following detailed description of the embodiments when read in conjunction with the accompanying drawings.

It is possible to provide a storage control apparatus and a control method of controlling storage apparatuses.

Other objects, features and advantages of the invention will become apparent from the following description of the embodiments of the invention taken in conjunction with the accompanying drawings.

BRIEF DESCRIPTION OF THE DRAWINGS

FIG. 12 is a diagram showing a pair management table according to the first embodiment.

FIG. 13 is a diagram showing a configuration information management table according to the first embodiment.

FIG. 14 is a diagram illustrating a data input/output request according to the first embodiment.

DESCRIPTION OF THE EMBODIMENTS

First Embodiment

Example of Overall Structure

Figure 1:
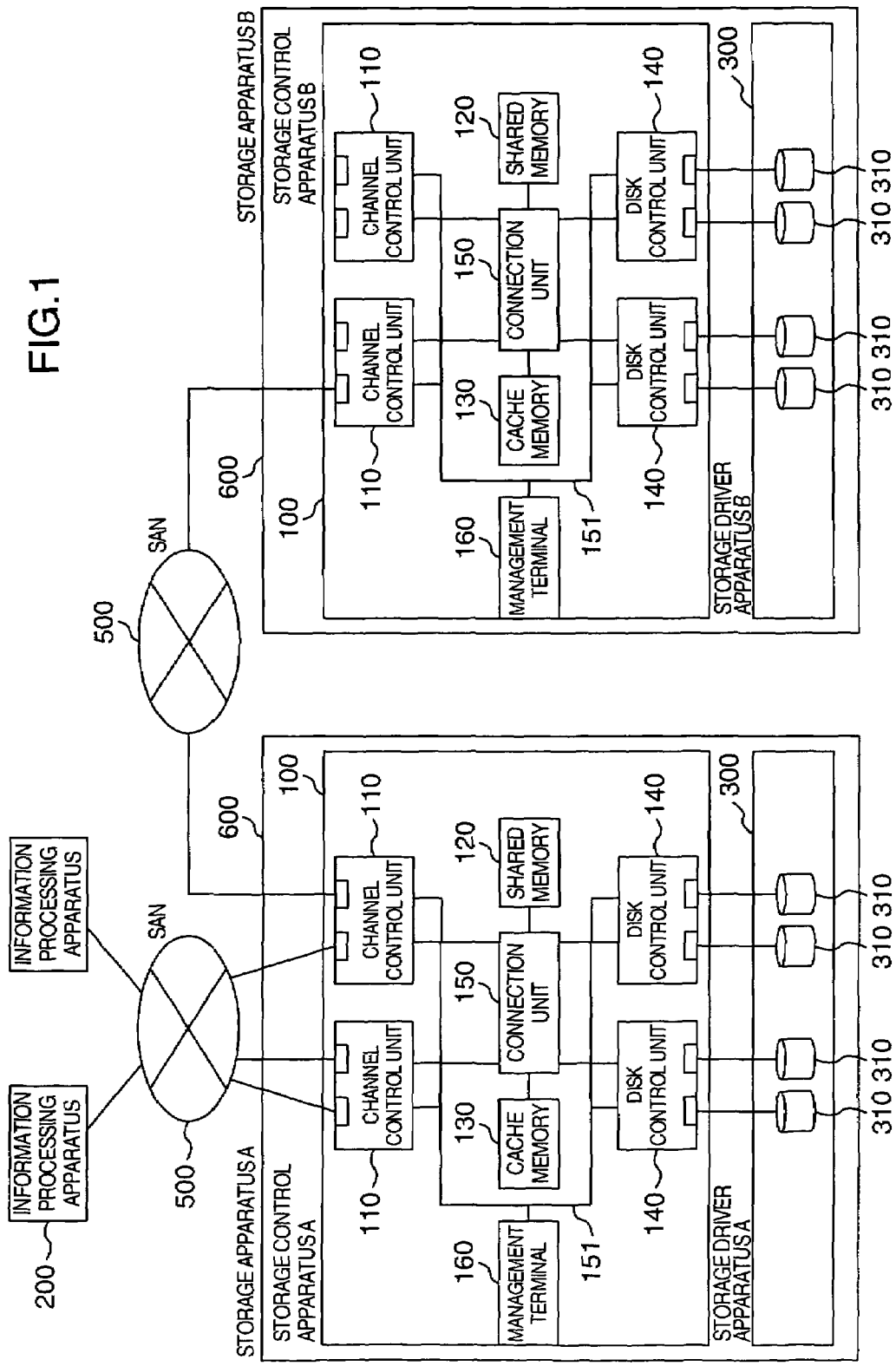
FIG. 1 is a block diagram showing the overall structure of a storage system according to a first embodiment of the invention.

FIG. 1 is a block diagram showing the overall structure of a storage system having a storage apparatus A 600 including a storage control apparatus A (first storage control apparatus) 100 and a storage apparatus B 600. The structure of the storage apparatus A 600 may be similar to that of the storage apparatus B 600. In the following, identifiers A and B are omitted when the storage apparatus A 600 and the storage apparatus B 600 are not necessary to be distinguished.

The storage apparatus 600 has the storage control apparatus 100 and a storage driver apparatus 300. The storage control apparatus A 100 receives a data input/output request from an information processing apparatus 200 and executes a data input/output process relative to a storage volume A (a first storage volume) 310 storing data and possessed by the storage driver apparatus A 300. The storage control apparatus B (a second storage control apparatus) 100 is connected to be capable of communicating with the storage control apparatus A 100 and executes a data input/output process relative to a storage volume B (a second storage volume) 310 storing data and possessed by the storage driver apparatus B 300.

The storage volume 310 has a physical volume and a logical volume, the former being a physical storage area provided by a disk drive such as a hard disk drive and the latter being a storage area logically set to the physical volume. In the following, the storage volume 310 and logical volume are called a logical unit (LU) where appropriate.

The information processing apparatus 200 is an information equipment such as a computer having a CPU and a memory. CPU of the information processing apparatus 200 executes various programs to realize a variety of functions. The information processing apparatus 200 may be a personal computer, a work station or a main frame computer.

The storage control apparatus A 100 is connected to be capable of communicating with the information processing apparatus 200 via a storage area network (SAN) 500. Communications between the information processing apparatus 200 and storage control apparatus A 100 via SAN 500 are generally performed based upon a fibre channel protocol. In this case, SAN 500 is constituted of a communication equipment having at least one or more switches or the like in conformity with the fibre channel protocol. The information processing apparatus 200 transmits a data input/output request to the storage control apparatus A 100 in accordance with the fibre channel protocol. When communications are performed in conformity with the fibre channel protocol, data to be transmitted and received is divided into one or more data blocks for each predetermined data length (e.g., for each 2 k byte). Communications are controlled in the unit of each data block.

It is obvious that the information processing apparatus 200 and storage control apparatus A 100 can be connected without SAN 500. In this case, communications between the information processing apparatus 200 and storage control apparatus A 100 may be performed by using a communication protocol for a main frame, such as Fibre Connection (FICON) (registered trademark) and Enterprise System Connection (ESCON) (registered trademark), or a communication protocol such as Transmission Control Protocol/Internet Protocol (TCP/IP) used by the Internet or the like.

The storage control apparatus A 100 is also connected to be capable of communicating with the storage control apparatus B 100 via SAN 500. SAN 500 between the storage control apparatus A 100 and storage control apparatus B 100 is constituted of a communication equipment having at least one or more switches or the like in conformity with, for example, the fibre channel protocol. When communications are performed in conformity with the fibre channel protocol, data to be transmitted and received is divided into one or more data blocks for each predetermined data length. Communications are controlled in the unit of each data block. SAN 500 interconnecting the storage control apparatus A 100 and storage control apparatus B 100 may be connected to be able or unable to communicate with SAN 500 interconnecting the storage control apparatus A 100 and information processing apparatus 200. It is obvious that the storage control apparatus A 100 and storage control apparatus B 100 can be connected without SAN 500. In this case, communications between the storage control apparatus A 100 and storage control apparatus B 100 may be performed by using a communication protocol for a main frame, such as FICON (registered trademark) and ESCON (registered trademark), or a communication protocol such as TCP/IP used by the Internet or the like.

The storage apparatus B 600 may be installed at a location remote from the storage apparatus A 600. In this case, even if data stored in the storage apparatus A 600 is erased or data cannot be read or written due to a disaster, information processing services by the information processing apparatus 200 can continue by using data stored in the storage apparatus B 600 through a remote copy between the storage apparatus A 600 and storage apparatus B 600. A remote copy means that a copy of data stored in the storage apparatus A 600 is stored in the storage apparatus B 600, or means such technology. In order to keep consistency between data stored in the storage apparatus A 600 and data stored in the storage apparatus B 600, when the information processing apparatus 200 writes data in the storage apparatus A 600, a copy of the write data is transmitted from the storage apparatus A 600 to the storage apparatus B 600. The storage apparatus B 600 stores a copy of the write data in the storage driver apparatus B 300. A remote copy between the storage apparatus A 600 and storage apparatus B 600 will be later described.

By connecting the storage apparatus B 600 and storage apparatus A 600 to be capable of communications, storage consolidation can be realized. The storage consolidation is the technology that a large amount of data separately and distributedly stored in a plurality of storage apparatuses is integrally managed in order to efficiently use the large amount of data distributedly stored in the respective storage apparatuses. With this technology, for example, if the storage apparatus A 600 is newly introduced into the information processing system, the old storage apparatus B 600 having been used until then is used as it is so that a large amount of past data can be utilized efficiently. Data stored in storage apparatuses 600 of different makers can also be integrally managed. In this case, the information processing apparatus 200 can access not only the data stored in the storage apparatus A 600 by transmitting a data input/output request to the storage apparatus A 600, but also the data stored in the storage apparatus B 600. The details of the storage consolidation will be given later.

In the storage system shown in FIG. 1, although only one storage apparatus A 600 and one storage apparatus B 600 are shown, a plurality of storage apparatuses A 600 and a plurality of storage apparatuses B 600 may be used.

Storage Volume

The storage driver apparatus 300 has a number of disk drives. The storage apparatus 600 can therefore provide the information processing apparatus 200 with a large storage area. The storage driver apparatus 300 may constitute a disk array of, for example, a plurality of disk drives. In this case, the storage area supplied to the information processing apparatus 200 may be a plurality of disk drives under management by Redundant Arrays of Inexpensive Disks (RAID).

Each storage volume 310 is given a specific identifier (hereinafter called also a logical unit number (LUN)). Although the details thereof will be given later, as shown in FIG. 14 a data input/output request transmitted from the information processing apparatus 200 to the storage apparatus A 600 is written with LUN for designating the data storage area. The storage apparatus A 600 has a function of supplying the information processing apparatus 200 with a storage area through LUN designation.

The storage control apparatus 100 and storage driver apparatus 300 may be directly connected as shown in FIG. 1 or may be connected via a network. The storage driver apparatus 300 may be structured integrally with the storage control apparatus 100.

Storage Control Apparatus

The storage control apparatus 100 has channel control units 110, a shared memory 120, a cache memory (cache memory unit) 130, disk control units 140, a management terminal 160 and a connection unit 150.

The channel control units 110 have communication interfaces for communications with the information processing apparatus 200 and other storage apparatuses 600 and have a function of transferring a data input/output request and data to and from the information processing apparatus 200 and other storage apparatuses 600.

Each channel control unit 110 along with the management terminal 160 is connected via an internal LAN 151. With this connection, a micro program or the like to be executed by each channel control unit 110 can be transmitted from the management terminal 160 to the channel control unit 110 to be installed therein. The structure of the channel control unit 110 will be later described.

The connection unit 150 interconnects together the channel control unit 110, shared memory 120, cache memory 130 and disk control units 140. Data and command transfer is performed via the connection unit 150 among the channel control units 110, shared memory 120, cache memory 130 and disk control units 140. The connection unit 150 is made of a crossbar switch for example.

The shared memory 120 and cache memory 130 are a memory shared by the channel control units 110 and disk control units 140. The shared memory 120 is used mainly for storing control information, commands and the like, whereas the cache memory 130 is used mainly for storing data. The cache memory 130 and shared memory 120 are structured to have a circuit board with memories for storing data.

For example, if a data input/output request received from the information processing apparatus 200 at the channel control unit 110 is a data write request, the channel control unit 110 writes the data write request in the shared memory 120 and the write data received from the information processing apparatus 200 in the cache memory 130. The disk control unit 140 monitors the shared memory 120, and when it detects that the a data write request is written in the shared memory 120, it reads the write data from the cache memory 130 in accordance with the data write request, and writes it to the storage driver apparatus 300.

If a data input/output request received from the information processing apparatus 200 at the channel control unit 110 is a data read request, the channel control unit 110 checks whether the read data exists in the cache memory 130. If the read data exists in the cache memory 130, the channel control unit 110 transmits the data to the information processing apparatus 200. If the read data does not exist in the cache memory 130, the channel control unit 110 writes the data read request in the shared memory 120 and monitors the shared memory 120. Upon detection of that the data read request is written in the shared memory 120, the disk control unit 140 reads the read data from the storage driver apparatus 300, writes it in the cache memory 130, and writes this effect in the shared memory 120. Upon detection of that the read data is written in the cache memory 130, the channel control unit 110 transmits the read data to the information processing apparatus 200.

In this manner, data is transferred via the cache memory between the channel control unit 110 and disk control unit 140. The cache memory 130 and shared memory 120 may be structured integrally.

Data for transmission and reception between the storage control apparatus A 100 and the information processing apparatus 200 or storage control apparatus B 100 is stored in the cache memory 130. For example, when the storage apparatus A 600 receives a data write request relative to the storage apparatus B 600 from the information processing apparatus 200, the channel control unit 110 of the storage apparatus A 600 stores the data write request and write data in the cache memory 130 and transmits them to the storage apparatus B 600. In response to this, the storage apparatus B 600 writes the write data in the storage driver apparatus B 300 in accordance with the received data write request. When the storage apparatus A 600 receives a data write request and write data relative to its storage driver apparatus A 300 from the information processing apparatus 200 and if the write data is to be used as a remote copy to the storage apparatus B 600, the channel control unit 110 of the storage apparatus A 600 transmits the write data stored in the cache memory 130 to the storage driver apparatus B 600. The storage apparatus B 600 writes the received write data in the storage driver apparatus B 300.

Instead of an indirect instruction of data read/write from the channel control unit 110 to the disk control unit 140 via the shared memory 120, a direct instruction of data read/write from the channel control unit 110 to the disk control unit 140 may be performed without involving the shared memory 120.

The channel control unit 110 may be provided with the function of the disk control unit 140 to make the channel control unit 110 read/write the data relative to the storage driver apparatus 300.

The disk control unit 140 reads and writes data relative to the storage volume 310 of the storage driver apparatus 300. For example, as described above, in accordance with a data write request received from the information processing apparatus 200, the channel control unit 110 writes data in the storage driver apparatus 300.

Each disk control unit 140 together with the management terminal 160 is connected to the internal LAN 151 so that mutual communications are possible. It is therefore possible for the management terminal 160 to transmit and install a micro program or the like in each disk control unit 140 to be executed. The structure of the disk control unit 140 will be described later.

In this embodiment, although the description is assumed that the shared memory 120 and cache memory 130 are provided independently from the channel control unit 110 and disk control unit 140, the embodiment is not limited only to such arrangement. For example, it is also preferable that the shared memory 120 and cache memory 130 are distributedly provided to each of the channel control unit 110 and disk control unit 140. In this case, the connection unit 150 interconnects the channel control unit 110 and disk control unit 140 having the distributed shared memories 120 or cache memories 130.

Management Terminal

The management terminal 160 is a computer for the maintenance and management of the storage apparatus 600. By operating upon the management terminal 160, it becomes possible to perform, for example, setting the physical disk configuration of the storage driver apparatus 300, setting LU 310, installing micro programs to be executed by the channel control unit 110 and disk control unit 140, and the like.

The management terminal 160 may be built in the storage control apparatus 100, or it may be an externally mounted apparatus. The management terminal 160 may be a computer dedicated to the maintenance and management of the storage control apparatus 100 and storage driver apparatus 300, or it may be a general purpose computer provided with the maintenance and management function.

Figure 2:
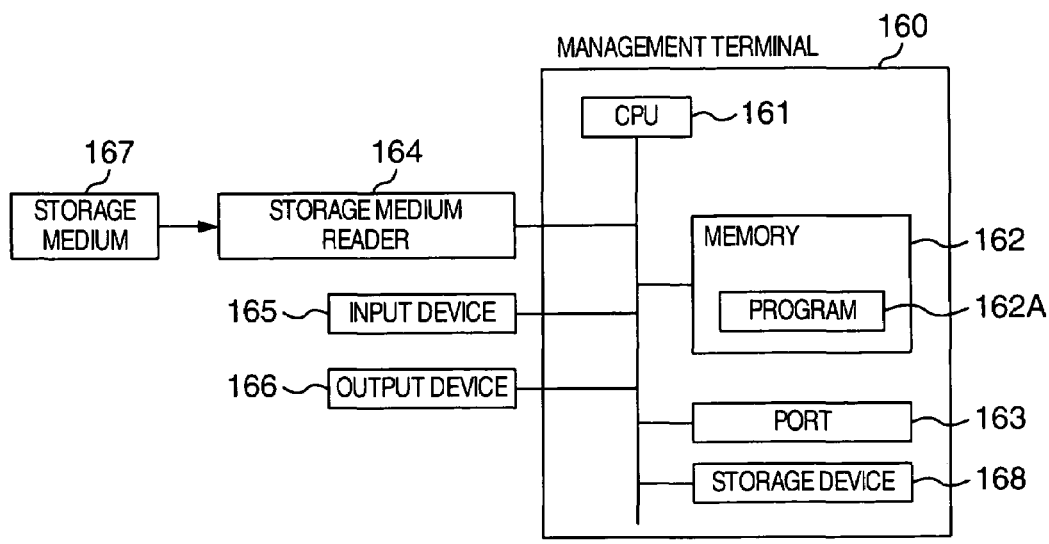
FIG. 2 is a block diagram showing the structure of a management terminal according to the first embodiment.

FIG. 2 is a block diagram showing the structure of the management terminal 160.

The management terminal 160 has a CPU 161, a memory 162, a port 163, a storage medium reader 164, an input device 165, an output device 166 and a storage device 168.

CPU 161 controls the entirety of the management terminal 160, and realizes the maintenance and management function by running a program 162A stored in the memory 162. The program 162A is stored in the memory 162. The storage medium reader 164 reads programs and data stored in the storage medium 167. The read program and data are stored in the memory 162 or storage device 168. For example, the storage medium reader 164 reads the program 162A recorded in the storage medium 167 and stores it in the memory 162 or storage device 168. Similarly, for example, the storage medium reader 164 reads a micro program stored in the storage medium 167 to be executed by the channel control unit 110 or disk control unit 140 and stores it in the memory 162 or storage device 168, the micro program being thereafter installed in the channel control unit 110 or disk control unit 140.

The storage medium 167 may be a flexible disk, a CD-ROM, a semiconductor memory or the like. The storage medium reader 164 may be built in the management terminal 160 or it may be an external apparatus. The storage device 168 is, for example, a hard disk drive, a semiconductor memory device or the like. The input device 165 is used for an operator or the like to enter data or the like to the management terminal 160. The input device may be a keyboard, a mouse or the like. The output device 166 is an apparatus for outputting information to an external. The output device 166 may be a display, a printer or the like. The port 163 is connected to the internal LAN 151 so that the management terminal 160 can communicate with the channel control unit 110, disk control unit 140 and the like.

Channel Control Unit

Figure 3:
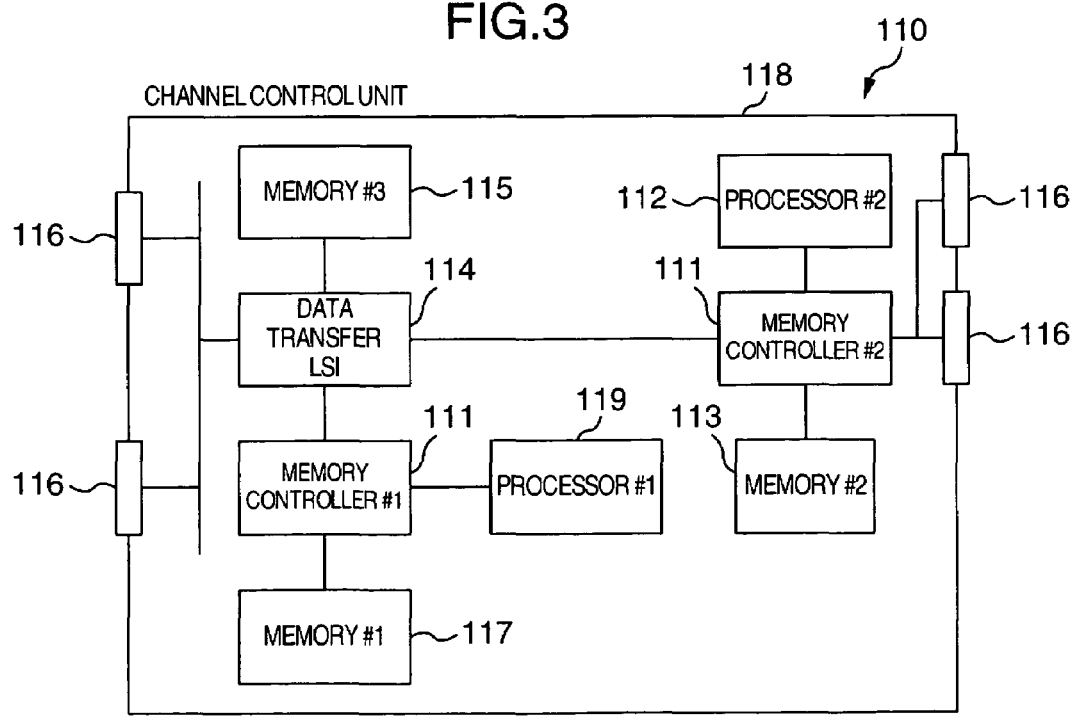
FIG. 3 is a block diagram showing the structure of a channel control unit according to the first embodiment.

FIG. 3 shows the structure of the channel control unit 110. The channel control unit 110 is a discrete board unit having a circuit board 118. The channel control unit 110 is constituted of a single or a plurality of circuit boards 118. The circuit board 118 has a processor #1 119, a processor #2 112, a data transfer LSI 114, a memory #1 117, a memory #2 113, a memory controller #1 111, a memory controller #2 111, a memory #3 115 and connectors 116.

The processor #1 119, processor #2 112, data transfer LSI 114, memory #1 117, memory #2 115 and memory controller #1 are interconnected by Peripheral Component Interconnect (PCI) buses for communications. All of these components are not always required to be connected by a PCI bus, but part or the whole of the components may be connected in conformity with another standard. Of these components, the memory #1 117, memory #3 115 and memory controller #1 111 constitute a second memory. The data transfer LSI 114, processor #2 112, memory #2 113 and memory controller #2 111 constitute a data transfer control unit. The processor #1 119 constitutes an input/output control unit.

The processor #2 112, memory #2 113 and memory controller #2 111 provide a communication interface function for communications with the information processing apparatus 200 and another storage apparatus 600. For example, data is converted into the data format in conformity with the fibre channel protocol and transmitted to another storage apparatus 600. The connectors 116 connected to the memory controller #2 111 are used for communications with the information processing apparatus 200 and another storage apparatus 600. The processor #2 112 executes various programs stored in the memory #2 113 to control to realize the communication interface function. Data transferred to and from the information processing apparatus 200 and another storage apparatus 600 is stored in the memory #2 113. Namely, the processor #2 112 transmits the data stored in the memory #2 113 to the information processing apparatus 200 and another storage apparatus 600 and stores the data received from the information processing apparatus 200 and another storage apparatus 600 in the memory #2 113.

The processor #2 112, memory #2 113, memory controller #2 111 and connector 116 also function as a port to be connected to the port of the fibre channel switch constituting SAN 500. Although well known in the fibre channel technical field, the port is assigned a World Wide Name (WWN) which is an identifier for identifying the equipment on SAN 500.

The processor #1 119 executes a control program 700 stored in the memory #1 117 to control the whole of the channel control unit 110. For example, a data input/output request transmitted from the information processing apparatus 200 is analyzed to judge whether the request is directed either to the storage driver apparatus A 300 or to the storage driver apparatus B 300. If the request is directed to the storage driver apparatus A 300, it is judged whether a remote copy is necessary. The processor #1 119 performs other judgements, and in accordance with the judgement results, a data transfer instruction is given to the data transfer LSI 114.

In response to an instruction from the processor #1 119, the data transfer LSI 114 controls as a PCI bus master the data transfer between the cache memory 130 and memory #2 113. More specifically, in response to an instruction from the processor #1 119, the data transfer LSI 114 reads data transfer information from the memory #1 117 to conduct data transfer between the cache memory 130 and memory #2 113 in accordance with the read data transfer information. The data transfer information is written by the processor #1 119 into the memory #1 117 and includes the storage location of data in the cache memory 130 and the storage location of the data in the information processing apparatus 200, storage control apparatus B 100 or storage apparatus B 600.

The details of data transfer between the cache memory 130 and memory #2 113 will be later given.

Disk Control Unit

Figure 4:
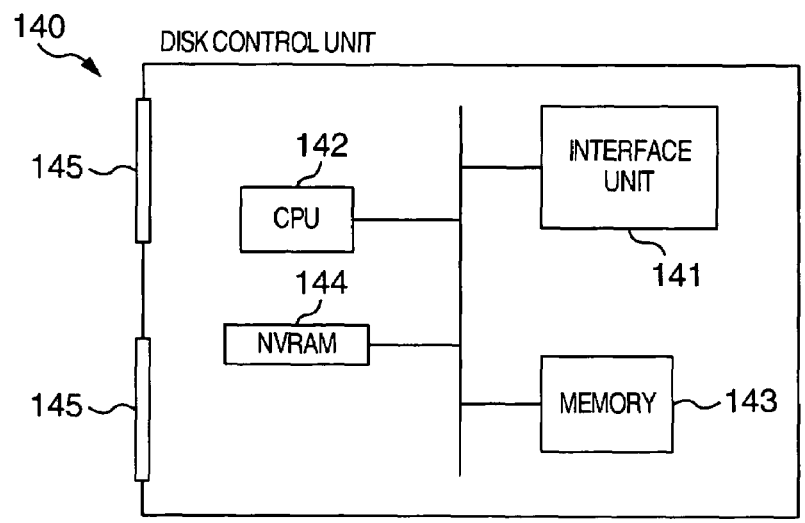
FIG. 4 is a block diagram showing the structure of a disk control unit according to the first embodiment.

FIG. 4 shows the structure of the disk control unit 140.

The disk control unit 140 has an interface unit 141, a memory 143, a CPU 142, a nonvolatile random-access memory (NVRAM) 144 and connectors 145, which are made of an integral unit constituted of a single or a plurality of circuit boards.

The interface unit 141 has communication interfaces for communications with the channel control unit 110 and the like via the connection unit 150 and for communications with the storage driver apparatus 300.

CPU 142 controls the whole of the disk control unit 140 and communicates with the channel control unit 110, storage driver apparatus 300 and management terminal 160. CPU 142 executes various programs stored in the memory 143 and NVRAM 144 to realize the function of the disk control unit 140. The function to be realized by the disk control unit 140 includes the read/write control of data relative to the storage driver apparatus 300, the control of RAID and the like.

NVRAM 144 is a nonvolatile memory for storing programs for controlling CPU 142. The contents of the program stored in NVRAM 144 can be written or overwritten by using the management terminal 160.

Information Processing Apparatus

Figure 5:
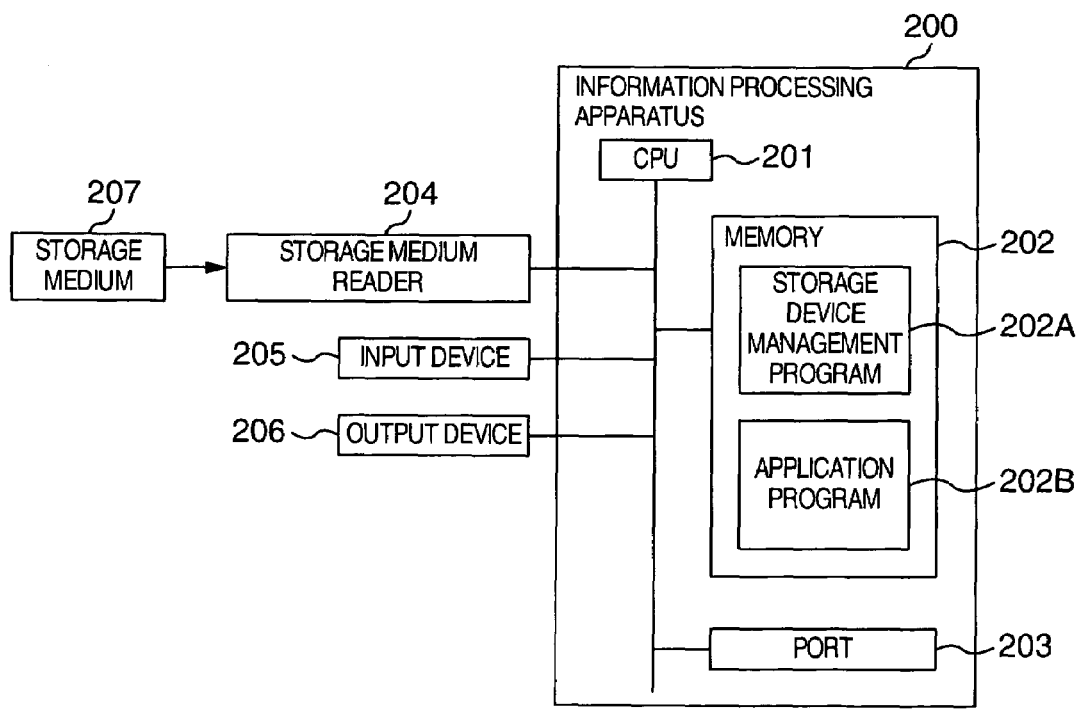
FIG. 5 is a block diagram showing the structure of an information processing apparatus according to the first embodiment.

FIG. 5 is a block diagram showing the structure of the information processing apparatus 200.

The information processing apparatus 200 has a CPU 201, a memory 202, a port 203, a storage medium reader 204, an input device 205 and an output device 206.

CPU 201 controls the whole of the information processing apparatus 200 and realizes various functions by executing programs stored in the memory 202. For example, CPU 201 executes an application program 202B to supply various information processing services such as automatic bank deposit/withdrawal services and air plane seat booking services. CPU 201 executes a storage device management program 202A to manage the storage volume 310. For example, a correspondence is checked between the storage volume A 310 of the storage driver apparatus A 300 and the storage volume B 310 of the storage driver apparatus B 300, and when data is written in the storage volume A 310, a command is transmitted to the storage control apparatus A 100 to write a copy of the data in the corresponding storage volume B 310. Setting LUN of the storage volume 310 can also be performed. The storage medium reader 204 reads programs and data recorded in the storage medium 207. The read programs and data are stored in the memory 202. For example, the storage medium reader 204 reads the storage device management program 202A and application program 202B recorded in the storage medium 207 and stores them in the memory 202. The storage medium 207 may be a flexible disk, a CD-ROM, a semiconductor memory or the like. The storage medium reader 204 may be built in the information processing apparatus 200 or it may be an external apparatus. The input device 205 is used for an operator or the like to enter data or the like to the information processing apparatus 200. The input device 205 may be a keyboard, a mouse or the like. The output device 206 is an apparatus for outputting information to an external. The output device 206 may be a display, a printer or the like. The port 203 is used for communications with the storage apparatus 600. The port 203 is assigned a World Wide Name (WWN) which is an identifier for identifying an equipment on SAN 500. The port 203 can also be used for communications with another information processing apparatus 200. In this case, for example, the storage device management program 202A and application program 202B are received from another information processing apparatus 200 via the port 203 and stored in the memory 202.

Data Transfer

Next, description will be made on data transfer by the channel control unit 110 between the cache memory 130 and the information processing apparatus 200 or storage control apparatus B 100.

Figure 8:
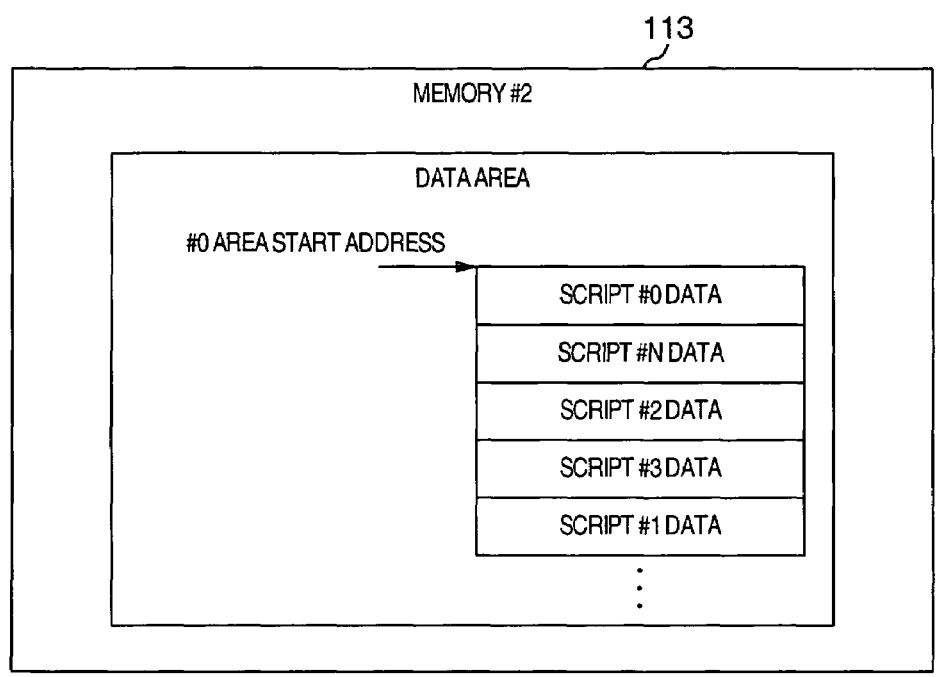
FIG. 8 is a diagram showing a memory #2 according to the first embodiment.
Figure 9:
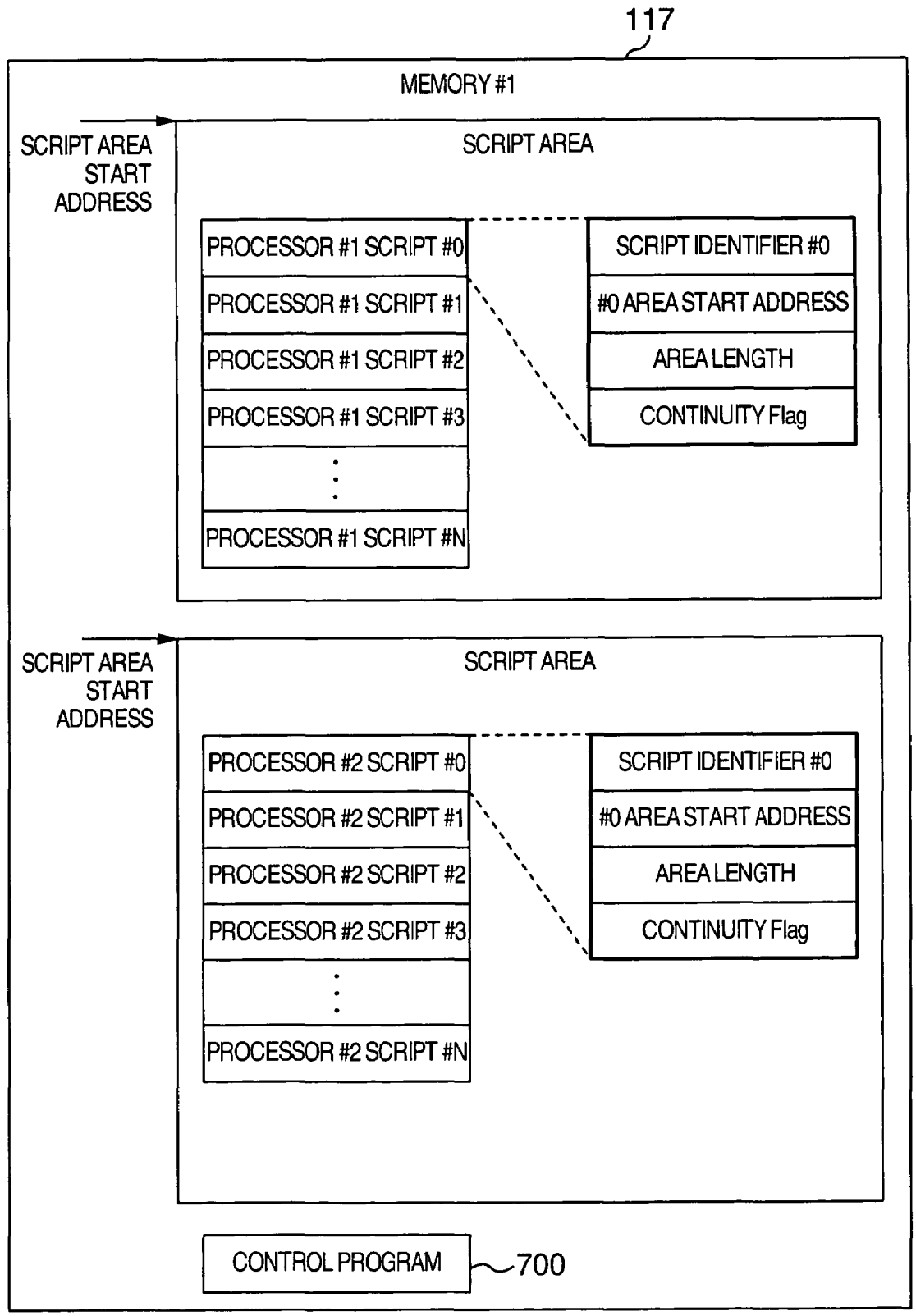
FIG. 9 is a diagram showing a memory #1 according to the first embodiment.

The memory #2 113 has a data area as shown in FIG. 8. Stored in the data area is data to be transferred to the cache memory 130 and data transferred from the cache memory 130. The storage location of each of these data, the size (area length) of the storage area of each of these data and the like in the data area, are stored, as shown in FIG. 9, in a script area of the memory #1 117 as a processor #2 script (data transfer information). The processor #2 script has the fields of "script identifier", "area start address", "area length" and "continuity Flag". The "script identifier" indicates an identification number added to each processor #2 script. The "area start address" indicates a storage address of data stored in the data area of the memory #2 113. The "area length" indicates the size of the storage area of data. The "continuity Flag" is a flag which is set when a plurality of data to be stored in the data area are transferred in one block. These processor #2 scripts stored in the memory 1 117 are set by the processor #1 119 and written in the script area of the memory #1 117.

Figure 10:
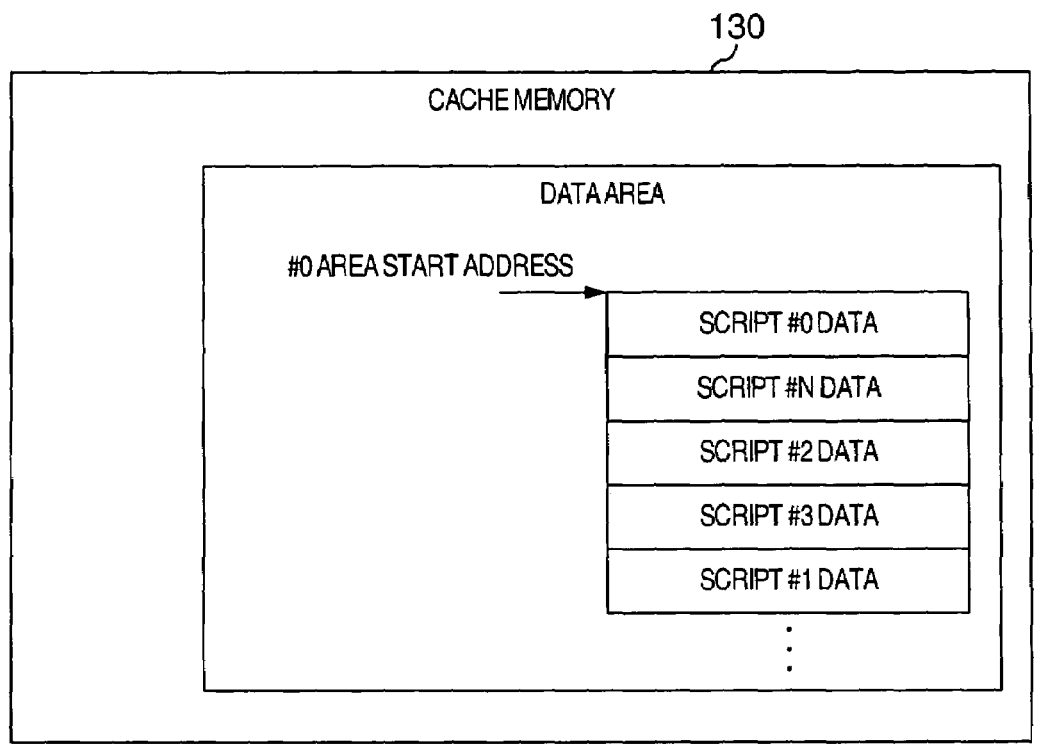
FIG. 10 is a diagram showing a cache memory according to the first embodiment.

As shown in FIG. 10, stored in the data area of the cache memory 130 is data to be transferred to the memory #2 113 or data transferred from the memory #2 113. The storage location of each of these data, the size (area length) of the storage area of each of these data and the like in the data area, are stored, as shown in FIG. 9, in a script area of the memory #1 117 as a processor #1 script (data transfer information). The processor #1 script has the fields of "script identifier", "area start address", "area length" and "continuity Flag". The meanings of these fields are similar to those of the processor #2 script in the memory #2 113. These processor #1 scripts stored in the memory #1 117 are set by the processor #1 119 and written in the script area of the memory #1 117.

Figure 6:
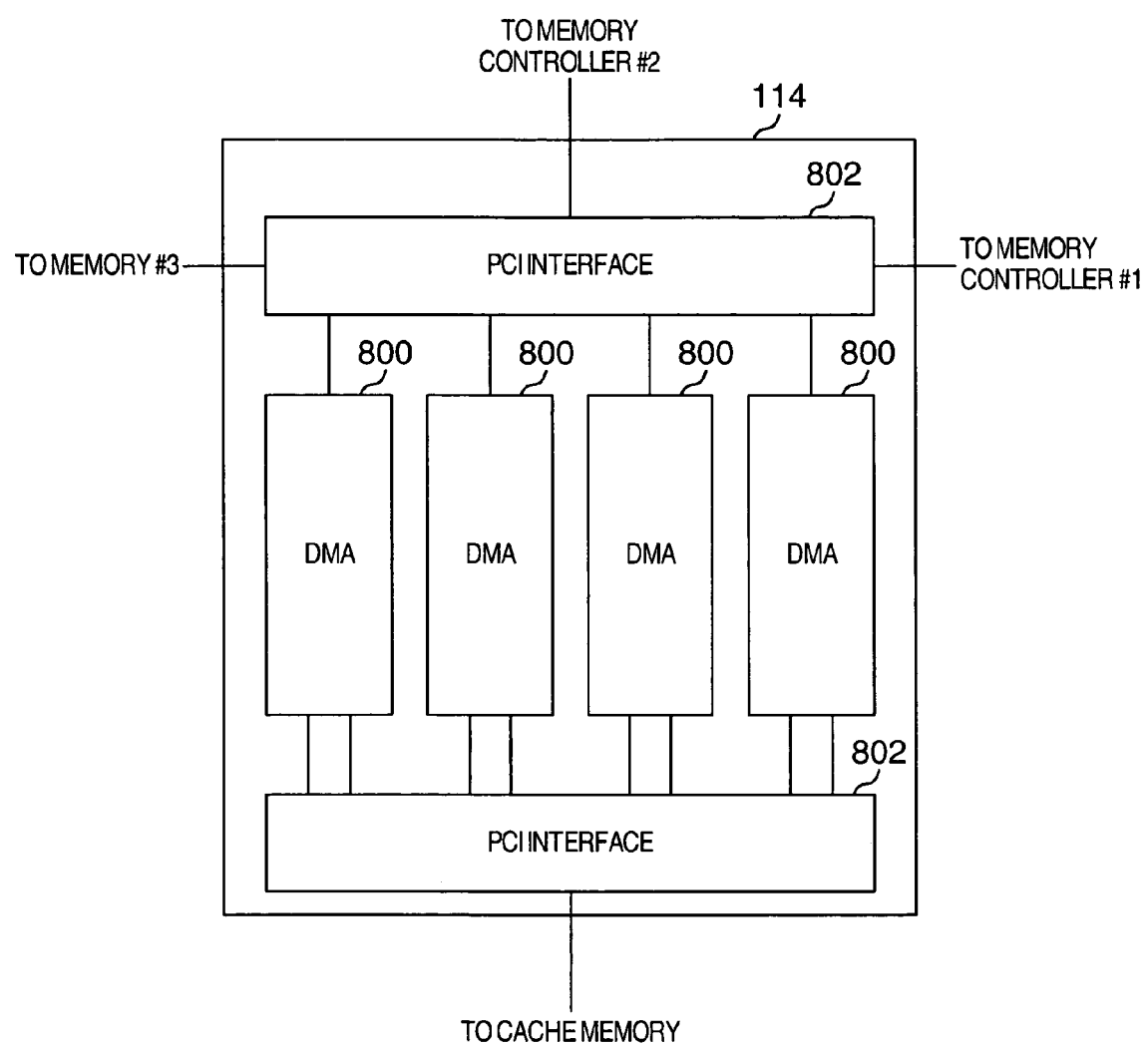
FIG. 6 is a block diagram showing the structure of a data transfer LSI according to the first embodiment.

Next, with reference to FIGS. 6 and 7, description will be given on the structure of the data transfer LSI 114 which controls data transfer between the cache memory 130 and memory #2 113 in accordance with each of these scripts.

The data transfer LSI 114 of this embodiment has four DMAs 800 and two PCI interfaces 802. The PCI interface 802 is a communication interface for communications with the memory controller 111 and the like via the PCI bus. It is not always necessary to connect the memory controller 111, cache memory and the like via the PCI bus, but some or all of these components may be connected by using the structure in conformity with another connection standard. In this case, instead of the PCI interface 802, an interface in conformity with the other standard is used.

DMA 800 has a DMA control unit A 801, a DMA control unit B 801, a transfer data buffer A (data buffer) 810, a transfer data buffer B (data buffer) 810, a register A (data transfer register) 807 and a register B (data transfer register) 807. The register A 807 and register B 807 each have a transfer start register 803, a transfer register 804, an initial setting register 805 and a script register 806. The structures of the DMA control unit A 801 and DMA control unit B 801, the structures of the transfer data buffer A 810 and transfer data buffer B 810 and the structures of the register A 807 and register B 807 are respectively similar. The identification characters A and B are not added when discrimination therebetween is not necessary.

The DMA control unit 801 controls data transfer. For example, the DMA control unit 801 preforms reading a script (data transfer information) stored in the memory #1 117 writing it in the register A 807 or register B 807, controlling data transfer via the transfer data buffer A 810 or transfer data buffer B 810 in accordance with the read script, outputting a data transfer a completion status, and other operations. The DMA control unit 801 may be made of only hardware or a combination of hardware and software. The DMA control unit 801 also controls the memory #3 115. It is therefore possible to write data stored in the transfer data buffer 810 and a script stored in the-register 807 into the memory #3 115 and to read data and a script from the memory #3 115.

The transfer start register 803 includes a "request transfer length" register, a "transfer direction" register, a "processor #2 start script number" register and a "processor #1 start script number" register.

The "request transfer length" register stores a total data length of data to be transferred between the cache memory 130 and the information processing apparatus 200 or storage control apparatus B 100. The request transfer length is determined from a data input/output request received from the information processing apparatus 200. For example, when a write request of 8 kilobyte (kB) data is received from the information processing apparatus 200, 8 kB is written in the "request transfer length" register. Although the details will be given later, the request transfer length is written in the transfer start register 803 of DMA 800 by the processor #1 119 when the processor #1 119 starts transferring data to DMA 800.

The "transfer direction" register stores either a transfer direction from the information processing apparatus 200 or storage control apparatus B 100 to the cache memory 130 or a transfer direction from the cache memory 130 to the information processing apparatus 200 or storage control apparatus B 100. The transfer direction is determined by the processor #1 119 from a data input/output request received from the information processing apparatus 200. For example, if the processor #1 119 receives from the information processing apparatus 200 a data write request of writing data in the storage driver apparatus A 300, the transfer direction is from the memory controller #2 111 to the cache memory 130. If the processor #1 119 receives from the information processing apparatus 200 a data read request of reading data stored in the storage driver apparatus A 300, the transfer direction is from the cache memory 130 to the memory controller #2 111. If data is to be transmitted from the storage control apparatus B 100 to the storage control apparatus A 100, the transfer direction is from the memory controller #2 111 to the cache memory 130. Although the details will be given later, similar to the request transfer length, the transfer direction is written by the processor #1 119 into the transfer start register 803 of DMA 800 when the processor #1 119 starts data transfer to DMA 800.

The "processor #2 start script number" register stores an identifier for a processor #2 script stored in the memory #1 117. The DMA control unit 801 starts data transfer by reading the processor #2 script stored in the "processor #2 script number" register from the memory #1 117. The processor #2 start script number is written by the processor #1 119 into the transfer start register 803 of DMA 800 when the processor #1 119 starts data transfer to DMA 800. Alternatively if the continuity Flag is set to the processor #2 script, the DMA control unit 801 renews the processor #2 start script number.

The "processor #1 start script number" register stores an identifier for a processor #1 script stored in the memory #1 117. The DMA control unit 801 starts data transfer by reading the processor #1 script stored in the "processor #1 script number" register from the memory #1 117. The processor #1 start script number is written by the processor #1 119 into the transfer start register 803 of DMA 800 when the processor #1 119 starts data transfer to DMA 800. Alternatively if the continuity Flag is set to the processor #1 script, the DMA control unit 801 renews the processor #1 start script number.

The transfer register 804 includes a "transfer unit" register, a "transfer source address" register, a "transfer destination address" register and a "remaining transfer length" register.

The "transfer unit" register stores a data transfer length of one data transfer. The data transfer length of one data transfer is calculated by the DMA control unit 801.

The "transfer source address" register stores a storage location of data before transfer. The transfer source address is a storage location of data in the cache memory 130, a storage location of data in the information processing apparatus 200 or a storage location of data in the storage apparatus B 600. The transfer source address is determined from the transfer direction and the statement in the processor #1 script or processor #2 script. During data transfer, the DMA control unit 801 increments or decrements the value in the "transfer source address" register as the data transfer progresses.

The "transfer destination address" register stores a storage location of data after transfer. The transfer destination address is a storage location of data in the cache memory 130, a storage location of data in the information processing apparatus 200 or a storage location of data in the storage apparatus B 600. The transfer destination address is determined from the transfer direction and the statement in the processor #1 script or processor #2 script. During data transfer, the DMA control unit 801 increments or decrements the value in the "transfer destination address" register as the data transfer progresses.

The "remaining transfer length" register stores a value obtained by subtracting the already transferred data length from the request transfer length. The remaining transfer length is properly renewed by the DMA control unit 801 as the data transfer progresses.

The initial setting register 805 includes a "processor #2 script area start address" register, a "processor #2 number of scripts" register, a "processor #2 script size" register, a "processor #1 script area start address" register, a "processor #1 number of scripts" register, and a "processor #1 script size" register. The values of these registers of the initial setting register 805 may be read by the DMA control unit 801 from NVRAM of the channel control unit 110 at the time of power-on of the channel control unit 110.

The "processor #2 script area start address" register stores the start address of the script area of the memory #1 117, namely, the address at which the processor #2 script #0 is stored.

The "processor #2 number of scripts" register stores the number of processor #2 scripts.

The "processor #2 script size" register stores the size of a processor #2 script. By fixing the size of a processor #2 script and identifying the identifier of the processor #2 script, the storage address of a target processor #2 script can be calculated using as a base the start address of the script area.

The "processor #1 script area start address" register, "processor #1 number of scripts" register and "processor #1 script size" register are similar to those for the processor #2 script.

The script register 806 includes a "processor #2 execution script number" register, a "processor #2 effective or empty area length" register, a "processor #1 execution script number" register, and a "processor #1 effective or empty area length" register.

The "processor #2 execution script number" register stores an identifier of a processor #2 script under execution. The processor #2 execution script number is set by the DMA control unit 801.

The "processor #2 effective area length" register stores a value obtained by subtracting an already transferred data size from the area length written in the area length field of the processor #2 script. This value is properly decremented by the DMA control unit 801 as the data transfer progresses.

The "processor #1 execution script number" register and "processor #1 effective area length" register are similar to the "processor #2 execution script number" register and "processor #2 effective area length" register, respectively.

The transfer data buffer 810 is a buffer for storing data to be transferred between the cache memory 130 and memory #2 113. When data is transferred between the cache memory 130 and memory #2 113, the DMA control unit 801 transfers data via the transfer data buffer 810 by a store-and-forward style. For example, when data is transferred from the cache memory 130 to the memory #2 113, the DMA control unit 801 writes the data read from the cache memory 130 once into the transfer data buffer 810, and then reads the data from the transfer data buffer 810 and writes it into the memory #2 113.

A communication path between the transfer data buffer 810 and the memory controller #2 111 is shared by the transfer data buffer A 810 and transfer data buffer B 810. A communication path between the transfer data buffer 810 and cache memory 130 is provided separately for each of the transfer data buffer A 810 and transfer data buffer B 810. The reason for this is as follows. Communications between the transfer data buffer 810 and memory controller #2 111 are performed on the same circuit board 118 so that data transfer can be performed at relatively high speed, whereas communications between the transfer data buffer 810 and cache memory 130 are performed over different circuit boards so that data transfer is performed at relatively low speed. With the above-described arrangement, the data transfer performance relative to the cache memory 130 can be improved. A high data transfer performance can be realized even if two data transfer operations are performed at the same time by operating in parallel the two sets of the transfer data buffer 810, DMA control unit 801 and register 807. Since the data communication path between the transfer data buffer 810 and memory controller #2 111 is shared, the area of a communication path on the circuit board 118 can be reduced. Since the degree of layout freedom of components to be mounted on the circuit board 118 can be improved, the pattern design of the circuit board 118 can be made easy. The circuit board 118 and hence the storage control apparatus 100 can be made compact.

Data Input/Output Process

Figure 11:
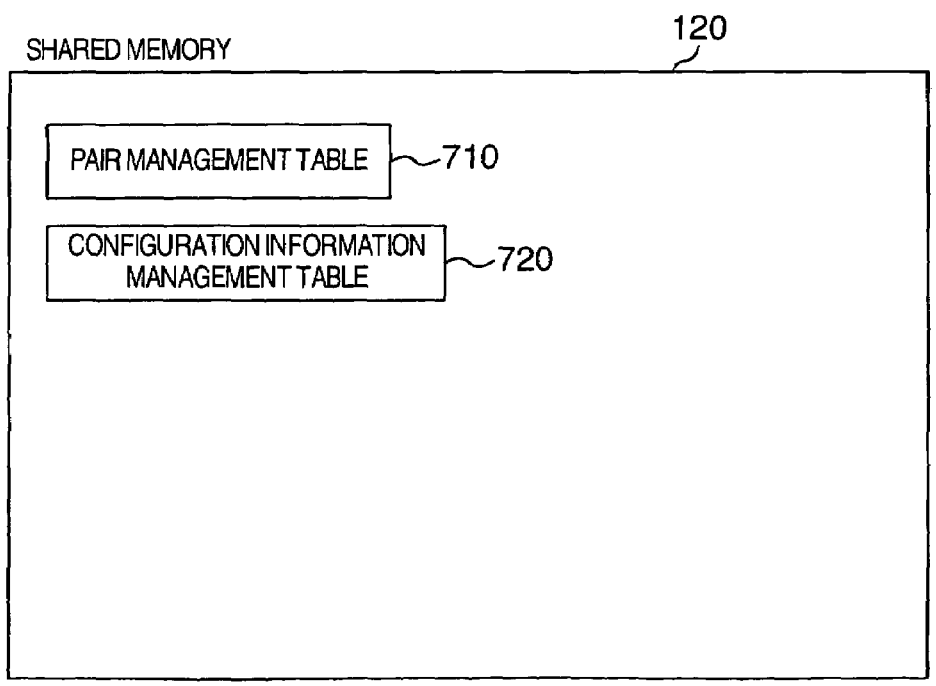
FIG. 11 is a diagram showing a shared memory according to the first embodiment.

As described earlier, when a data input/output request is transmitted from the information processing apparatus 200, the processor #1 119 analyzes the data input/output request to judge whether the request is directed either to the storage driver apparatus A 300 or to the storage driver apparatus B 300. If the request is directed to the storage driver apparatus A 300, it is judged whether a remote copy is necessary. The processor #1 119 performs other judgements, and in accordance with the judgement results, a data transfer instruction is given to the data transfer LSI 114. These judgements are made by referring to a pair management table 710 and a configuration information management table 720 stored in the shared memory 120 as shown in FIG. 11.

FIG. 13 shows the configuration information management table 720. The configuration information management table 720 is used for realizing the function that the storage apparatus A 600 supplies the information processing apparatus 200 with the storage volume 310 of the storage apparatus B 600 as the storage volume 310 of the storage apparatus A 600.

The configuration information management table 720 is written with not only the information of the storage volume 310 of the storage apparatus A 600 but also the information of the storage volume 310 of the storage apparatus B 600 (FIG. 13 shows only the information of the storage volume 310 of the storage apparatus B 600).

In FIG. 13, a field PortID is written with a port ID of the channel control unit 110 corresponding to each storage volume 310. A field WWN is written with WWN corresponding to the port ID. A field LUN is written with LUN of each storage volume 310. A field Capacity (KB) is written with a storage capacity to be presented by each storage volume 310. A field mapping LUN is written with LUN of the storage volume 310 of the storage apparatus B 600 corresponding to the port and LUN.

The contents of the configuration information management table 720 may be registered, for example, by the management terminal 160 of the storage apparatus A 600.

By using the configuration information management table 720, the storage apparatus A 600 supplies the information processing apparatus 200 with the storage volume 310 of the storage apparatus B 600 as if it is the storage volume 310 of the storage apparatus A 600. Namely, the information processing apparatus 200 can transmit the data input/output request for the storage volume 310 of the storage apparatus B 600 to the storage apparatus A 600. In an example shown in FIG. 15, the information processing apparatus 200 can perform data read/write relative to the storage volumes 310 of the storage apparatus A 600 identified by K+1 to N, just the same manner relative to the storage volumes 310 identified by 0 to M. However, the storage volumes 310 identified by K+1 to N are the storage volumes identified by 0 to M of the storage apparatus B 600. When a data input/output request for the storage volumes identified by K+1 to N is received from the information processing apparatus 200, the storage apparatus A 600 performs data transfer to and from the storage apparatus B 600 to access the storage volumes identified by 0 to M of the storage apparatus B 600.

Figure 15:
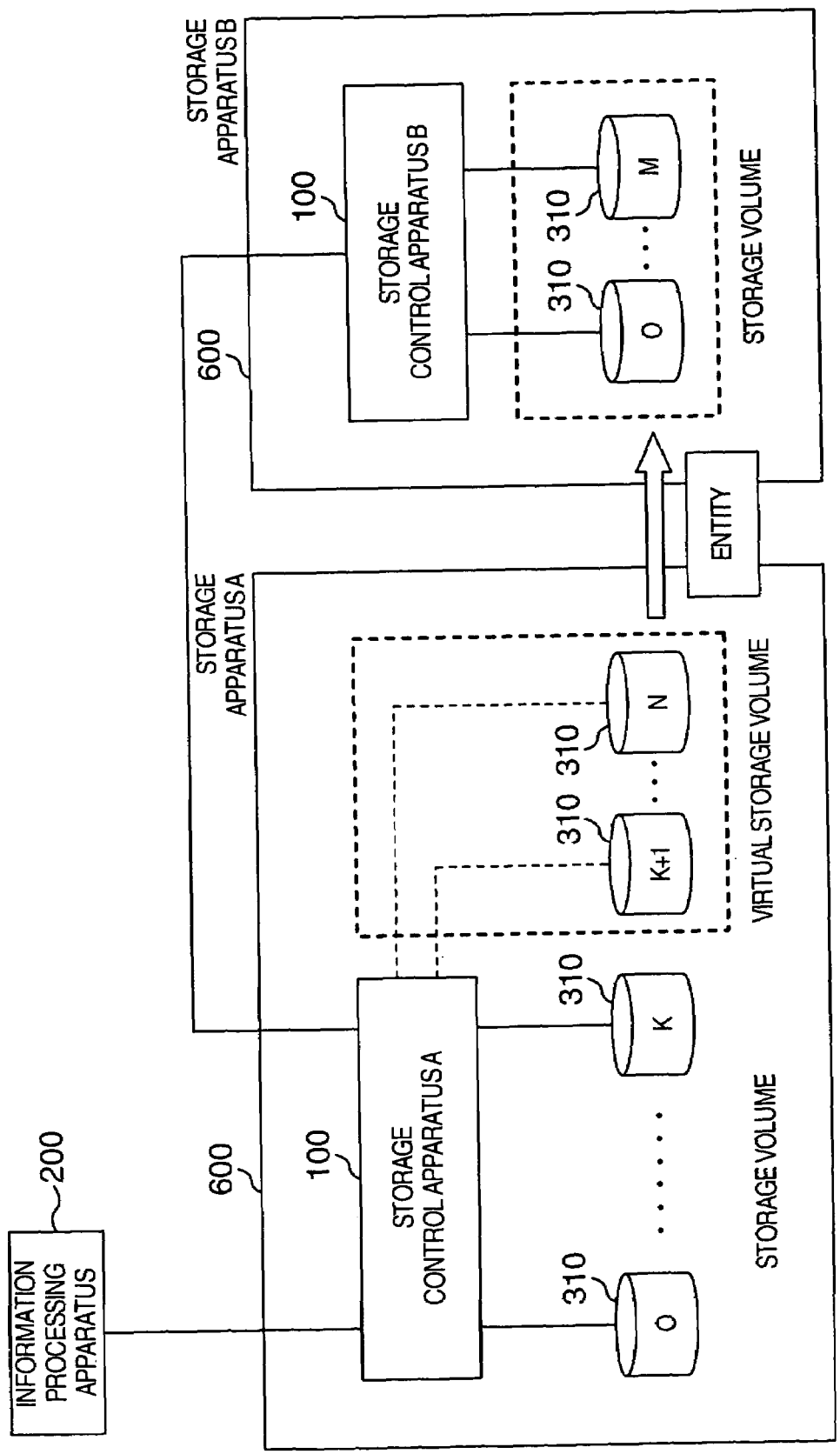
FIG. 15 is a block diagram illustrating management of a storage volume according to the first embodiment.

In the FIG. 15, the control method between the storage volume 310 in the storage apparatus A and the storage volume 310 in the storage apparatus B is disclosed in Japanese Patent Application No. 2003-337239, filed on Sep. 29, 2003.

Next, description will be made on the process to be executed when the storage apparatus A 600 receives from the information processing apparatus 200 a data input/output request for the storage volume 310 of the storage apparatus A 600 or storage apparatus B 600.

FIG. 14 shows an example of a data format of a data input/output request to be transmitted from the information processing apparatus 200 to the storage apparatus A 600. In FIG. 14, a host ID field is written with an identifier of the information processing apparatus 200 transmitted the data input/output request. For example, WWN of the port 203 of the information processing apparatus 200 is written. A port ID field is written with a port ID of the channel control unit 110 corresponding to the storage volume 310 which is a target of the data input/output request. A LUN field is written with LUN of the storage volume 310 which is a target of the data input/output request. An address field is written with a storage address of data which is a target of the data input/output request. A data length field is written with a data length of data which is a target of the data input/output request.

Following description is assumed that the data input/output request transmitted from the information processing apparatus 200 is a data write request. First, upon reception of the data write request from the information processing apparatus 200, the processor #1 119 of the storage apparatus A 600 stores data received together with the data write request into the cache memory 130.

Next, the processor #1 119 refers to the configuration information management table 720 to judge whether this data write request can be executed. The cases that the data write request cannot be executed, include the case that a target storage volume 310 for the data write request does not exist, the case that the size of write data exceeds the storage capacity of the storage volume 310, and other cases. If the data write request cannot be executed, a message to this effect is transmitted to the information processing apparatus 200 and the data write request is terminated.

If the data write request can be executed, the processor #1 119 transmits the data write request and write data to the storage apparatus B 600. This transmission can be performed in the following manner. First, the processor #1 119 writes a script for data transfer into the memory #1 117, then the data transfer LSI 114 reads the script from the memory #1 117 and writes it into the register 807, and in accordance with the read script, controls data transfer between the memory #1 117 and the storage control apparatus B 100. Upon reception of the data write request, the storage apparatus B 600 writes the write data into the storage volume B 310. The process for the data read request is performed in a similar manner.

A data write request to be transmitted from the storage apparatus A 600 to the storage apparatus B 600 is in conformity with the same protocol (e.g., same data format) as that of a data write request to be directly received from the information processing apparatus 200 at the storage apparatus B 600. Therefore, if the storage apparatus B 600 operates as the apparatus which supplies the storage apparatus A 609 with the volume 310, the structure and specification of the storage apparatus B 600 are not required to be modified or altered in a specific manner, so that the storage apparatus B 600 can be utilized efficiently with the minimum labor and at a low cost.

FIG. 12 shows the pair management table 710.

The pair management table 710 has a "pair type" field, a "copy type" field, a "copy source apparatus" field, a "copy destination apparatus" field, a "copy source volume" field, a "copy destination volume" field, and a "pair state" field.

The pair means a combination of two storage volumes 310. If the pair constituted of two storage volumes 310 exists in the same storage apparatus 600, this pair is called a "local pair", whereas if the pair exists in different storage apparatuses 600, this pair is called a "remote pair". Of the two storage volumes 310 constituting the pair, one is managed as a main storage volume 310 and the other is managed as a subsidiary storage volume 310. It is also possible to use a combination of one main storage volume 310 and a plurality of subsidiary volumes.

When the information processing apparatus 200 instructs the storage apparatus A 600 as a data copy source to form a remote pair, the storage apparatus A 600 updates the pair management table 710 in the shared memory 120. Thereafter, the storage apparatus A 600 instructs the storage apparatus B 600 as a data copy destination to form a remote pair. The storage apparatus B 600 updates the pair management table 710 in the shared memory 120 of the storage apparatus B 600.

The "pair type" field of the pair management table 710 indicates whether the pair is the local pair or the remote pair. The "copy type" field indicates, if the pair is the remote pair, whether the remote copy type is synchronous or asynchronous. The "copy source apparatus" field and "copy destination apparatus" indicate, if the pair is the remote pair, a copy source storage apparatus 600 and a copy destination storage apparatus 600, respectively. The "copy source volume" field indicates LUN of the main storage volume 310 of the pair, whereas the "copy destination volume" field indicates LUN of the subsidiary storage volume 310 of the pair.

The "pair state" filed indicates the state of the pair. The pair state includes "in pair", "in split" and "in rethink".

If the pair state is "in pair", a copy of data written in the main storage volume 310 from the information processing apparatus 200 is also reflected upon the subsidiary storage volume 310. Such a correspondence between the main storage volume 310 and subsidiary storage volume 310 can maintain the integrity of the contents stored in the main storage volume 310 and the contents stored in the subsidiary storage volume 310.

If the pair state is "in split", even if data is written in the main storage volume 310 from the information processing apparatus 200, the data is not reflected upon the subsidiary storage volume 310.

If the pair state is "in rethink", this state is an intermediate state during transition from "in split" to "in pair". Namely, updating data stored in the main storage volume 310 in the state of "in split" is being reflected upon the subsidiary storage volume 310. After this reflection, the pair state changes to the state "in pair".

The pair formation, pair split and pair rethink may be performed by entering an instruction into the input device 205 from an operator while the information processing apparatus 200 executes the storage device management program 202A. The instruction by the operator is transmitted to the channel control unit 110 of the storage apparatus 600. The channel control unit 110 executes the control program 700 and in accordance with the operator instruction, forms a pair and changes the pair state. In accordance with the pair state of the formed pair, the channel control unit 110 receiving a data write request for the main storage volume 310 in the state of, for example, "in pair", transmits a copy of write data to the storage apparatus B 600 to reflect it upon the subsidiary storage volume 310. More specifically, first, upon reception of a data write request from the information processing apparatus 200, the processor #1 119 of the storage apparatus A 600 stores write data received together with the data write request into the cache memory 130. The processor #1 119 instructs the disk control unit 140 to write the data into the storage volume A 310, and refers to the pair management table 710 to identify the storage volume B 310 into which a copy of the data is to be written. In order to write a copy of write data into the storage volume B 310, the processor #1 119 writes a data transfer script into the memory #1 117, and then the data transfer LSI 114 reads the script from the memory #1 117 and writes it into the register 807. In accordance with the read script, the data transfer LSI 114 controls transmission of write data from the memory #1 117 to the storage control apparatus B 100. Upon reception of this data write request, the storage apparatus B 600 writes the write data into the storage volume B 310.

In the storage system of this embodiment as described above, in response to a data input/output request received from the information processing apparatus 200 at the storage apparatus A 600, data transfer is performed between the storage apparatus A 600 and storage apparatus B 600. This data transfer is performed, as described earlier, by the input/output control unit including the processor #1 119 and by the data transfer control unit including the data transfer LSI 114. Usually, while a first data transfer is performed between the storage apparatus A 600 and storage apparatus B 600, a second data transfer will not be performed until the completion of the first data transfer.

Figure 16:
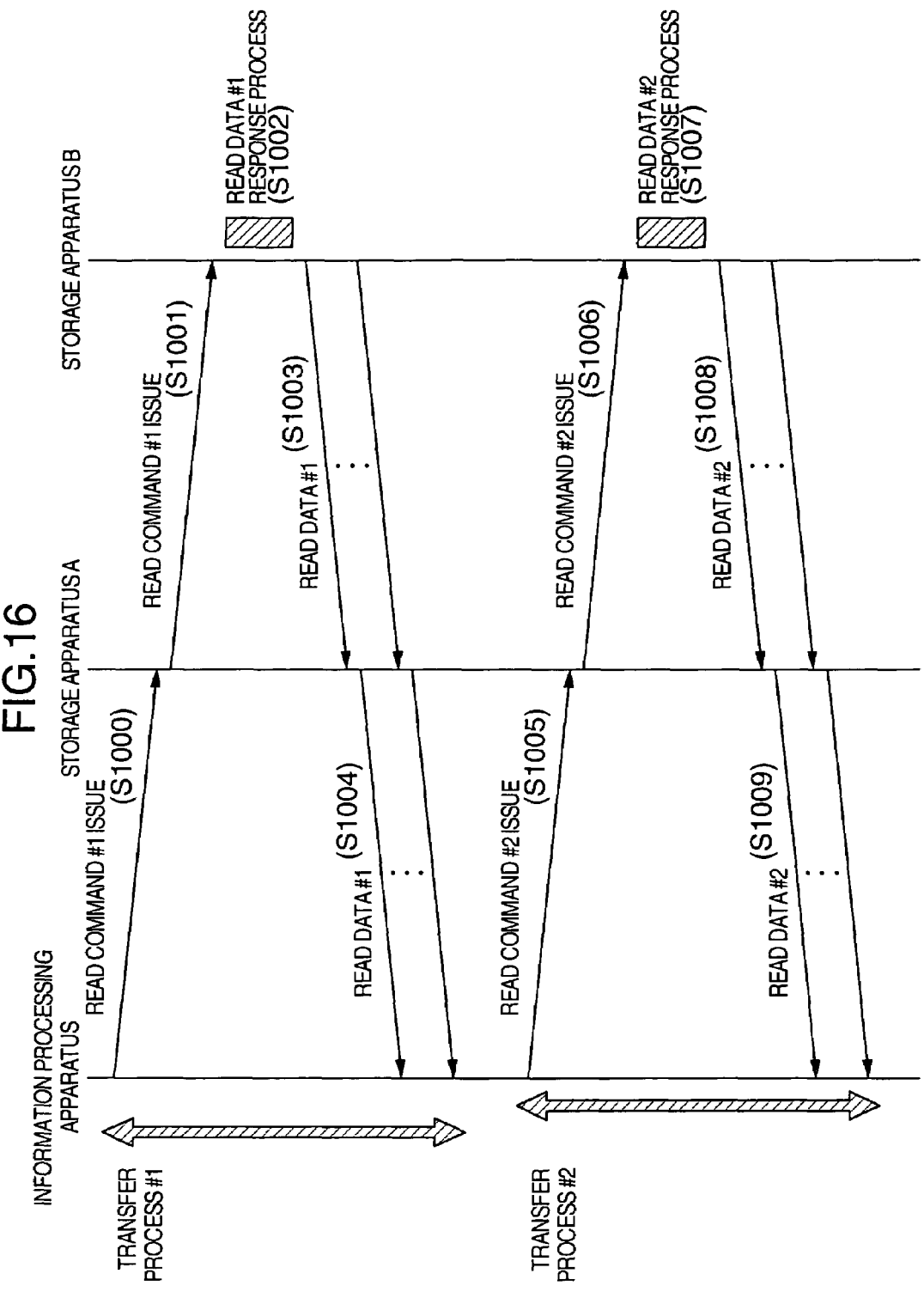
FIG. 16 is a flow chart illustrating a read command process according to another embodiment of the invention.

With reference to FIG. 16, more specific description will be made on the case that the information processing apparatus 200 reads data stored in the storage apparatus B 600. A read command (data read request) #1 received (S1000) from the information processing apparatus 200 at the storage apparatus A 600 is transmitted (S1001) to the storage apparatus B 600. The storage apparatus B 600 reads (S1002) data from the storage volume 310. Until the read data is received (S1003) from the storage apparatus B 600 and transmitted (S1004) to the information processing apparatus 200, the process of a read command #2 will not be executed. In the example shown in FIG. 16, after the process of the read command #1 is completed, the information processing apparatus 200 transmits a read command #2. Even if a read command #2 is transmitted before the read process for read data #1 is completed, the process of the read command #2 is performed after reading the read data #1 is completed (from S1005 to S1009). This is because the system is not structured in such a manner that the second data transfer can be performed while the first data transfer is performed by the data transfer LSI 114.

Figure 17:
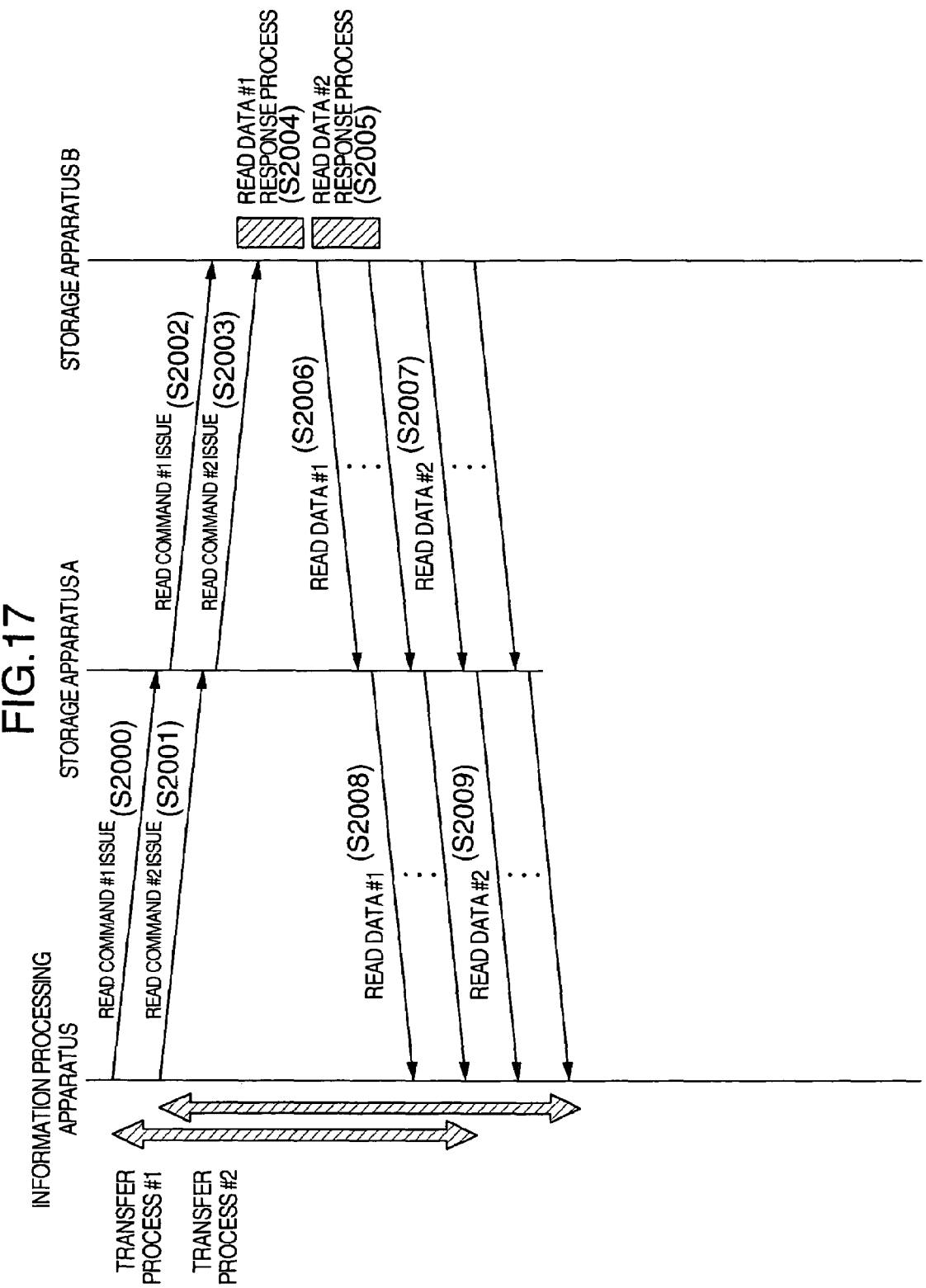
FIG. 17 is a flow chart illustrating a read command process according to the first embodiment.
Figure 18:
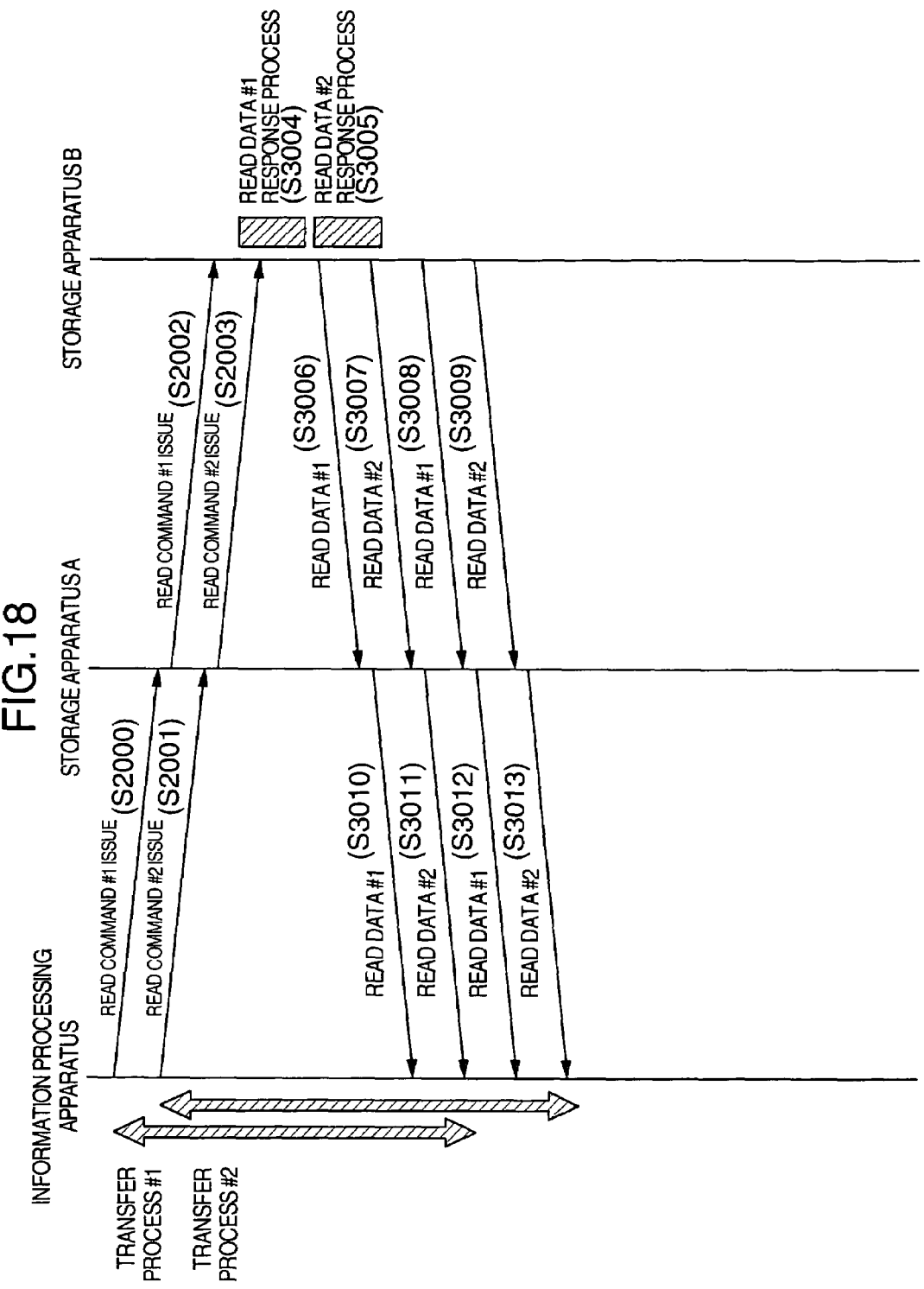
FIG. 18 is a flow chart illustrating the read command process according to the first embodiment.

However, in the storage control apparatus A 100 of this embodiment, as shown in FIGS. 17 and 18, when the read command #2 is received from the information processing apparatus 200 before receiving read data #1 from the storage apparatus B 600 starts, the read command #2 can be transmitted to the storage apparatus B 600 before receiving the read data #1 starts. In the example shown in FIG. 17, the read command #2 is transmitted to the storage apparatus B 600 before the read data #1 is received from the storage apparatus B 600, and the read data #2 is received after receiving the read data #1 from the storage apparatus B 600 is completed (from S2000 to S2009). In the example shown in FIG. 18, the read command #2 is transmitted to the storage apparatus B 600 before the read data #1 is received from the storage apparatus B 600, and the read data #2 is also received before receiving the read data #1 from the storage apparatus B 600 is completed (from S3000 to S3013).

FIGS. 16 to 18 illustrate that a plurality of read data are transmitted in response to one read command, indicating that data transfer is controlled in the unit of data block.

Data Transfer Flow

Next, with reference to the flow charts shown in FIGS. 25 to 29, description will be made on the flow of a data transfer process according to the embodiment.

When the storage control apparatus A 100 receives a data input/output request from the information processing apparatus 200, the processor #2 112 reserves the data area in the memory #2 113 (S4000). Reserving the data area means that if the data input/output request is a data write request, write data is stored in the memory #2 113, and that if the data input/output request is a data read request, a storage area for storing read data is reserved in the memory #2 113. The reserved data area is not limited only to one data area. This is because data associated with one data input/output request is required to be divided into a plurality of data blocks and stored in the memory #2 113, depending upon the distribution state and the like of data areas of the memory #2 113 capable of storing data.

Next, the processor #2 112 transmits the data input/output request received from the information processing apparatus 200 and information of the data area reserved in the memory #2 113, to the processor #1 119 (S4001).

In response to this, the processor #1 119 analyzes the data input/output request transmitted from the processor #2 112 (S4002) to recognize the request transfer length and transfer direction.

Next, the processor #1 119 reserves the data area having the size designated by the request transfer length in the cache memory 130 (S4003). Also in this case, a plurality of data areas may be reserved depending upon the distribution state and the like of memory space of the cache memory 130 capable of storing data.

The processor #1 119 creates a processor #1 script for each data area reserved in the cache memory 130. Similarly, the processor #1 119 creates a processor #2 script for each of the data areas reserved in the memory #2 113 in accordance with the data input/output request and the information of the data areas reserved-in the memory #2 113, respectively transmitted from the processor #2 112 (S4004). If a plurality of data areas are reserved, the continuity Flag is set in order to collectively manage the processor #1 scripts and processor #2 scripts.

In this manner the memory #1 117 is written with the processor #1 scripts including the information representative of the storage positions of data in the cache memory 130 and the processor #2 scripts including the information representative of the storage positions of data in the information processing apparatus 200 or storage apparatus B 600.

Thereafter, the processor #1 119 transmits transfer start information to the register A 807 or register B 807 in DMA 800 of the data transfer LSI 114, and writes the transfer start information in the transfer start register 803 in DMA of the data transfer LSI 114. The transfer start information contains the request transfer length, the transfer direction, an identifier of each processor #2 script and an identifier of each processor #1 script. In this manner, the processor #1 119 starts up the data transfer LSI 114 (S4005).

In response to this, DMA 800 starts a DMA transfer process (S4006). The DMA transfer process will be described with reference to the flow chart of FIG. 26.

By using the identifier of the processor #1 script and the identifier of the processor #2 script written in the transfer start information, the DMA control unit 801 acquires the processor #1 script and processor #2 script (S5000). Acquiring the script is performed in accordance with the flow chart shown in FIG. 27.

First, the DMA control unit 801 calculates the storage address of the processor #1 script in the memory #1 117, from the identifier of the processor #1 script written in the transfer start information and the size of the processor #1 script stored in the initial setting register 805 (S6000). After the address of the processor #1 script is calculated, the processor #1 script is read from the memory #1 117 at the calculated address (S6001). The DMA control unit 801 writes the area start address written in the processor #1 script in the transfer destination address field or transfer source address field of the transfer register 804, depending upon the transfer direction. The DMA control unit 801 writes the script identifier written in the processor #1 script and the area length written in the area length field, into the processor #1 execution script number field and processor #1 effective area length field respectively of the script register 806 (S6002)

Similarly, in accordance with the transfer start information, the DMA control unit 801 calculates the storage address of the processor #2 script in the memory #1 117, from the identifier of the processor #2 script written in the transfer start information and the size of the processor #1 script stored in the initial setting register 805 (S6000). After the address of the processor #2 script is calculated, the processor #2 script is read from the memory #1 117 at the calculated address (S6001).

The DMA control unit 801 writes the area start address written in the processor #2 script in the transfer destination address field or transfer source address field of the transfer register 804, depending upon the transfer direction. The DMA control unit 801 writes the script identifier written in the processor #2 script and the area length written in the area length field, into the processor #2 execution script number field and processor #2 effective area length field respectively of the script register 806 (S6002)

Next, the DMA control unit 801 determines the transfer unit (S5001). The transfer unit is determined in accordance with the flow chart shown in FIG. 28.

First, the DMA control unit 801 writes the remaining transfer length in the remaining transfer length field of the transfer register 804 (S7000). At the transfer start, the request transfer length is written.

The transfer unit is determined as the shortest length among the effective area length of the processor #1, the effective area length of the processor #2 and the remaining transfer length (S7001 to S7007).

The DMA control unit 801 transfers the data stored in the transfer register 804 at the transfer source address to the transfer destination address by a data size corresponding to the transfer unit (S5002). Data transfer is performed via the transfer data buffer 810.

During the execution of data transfer, the transfer source address, transfer destination address and remaining transfer length respectively in the transfer register 804 are sequentially renewed, and the processor #2 effective area length and processor #1 effective area length respectively in the script register 806 are also sequentially decremented by an amount corresponding to the size of already transferred data.

When the value of any one of the processor #2 effective length and processor #1 effective area length in the script register 806 and the remaining transfer length becomes 0, the DMA control unit 801 performs a transfer completion judgement process (S5003).

Figure 29:
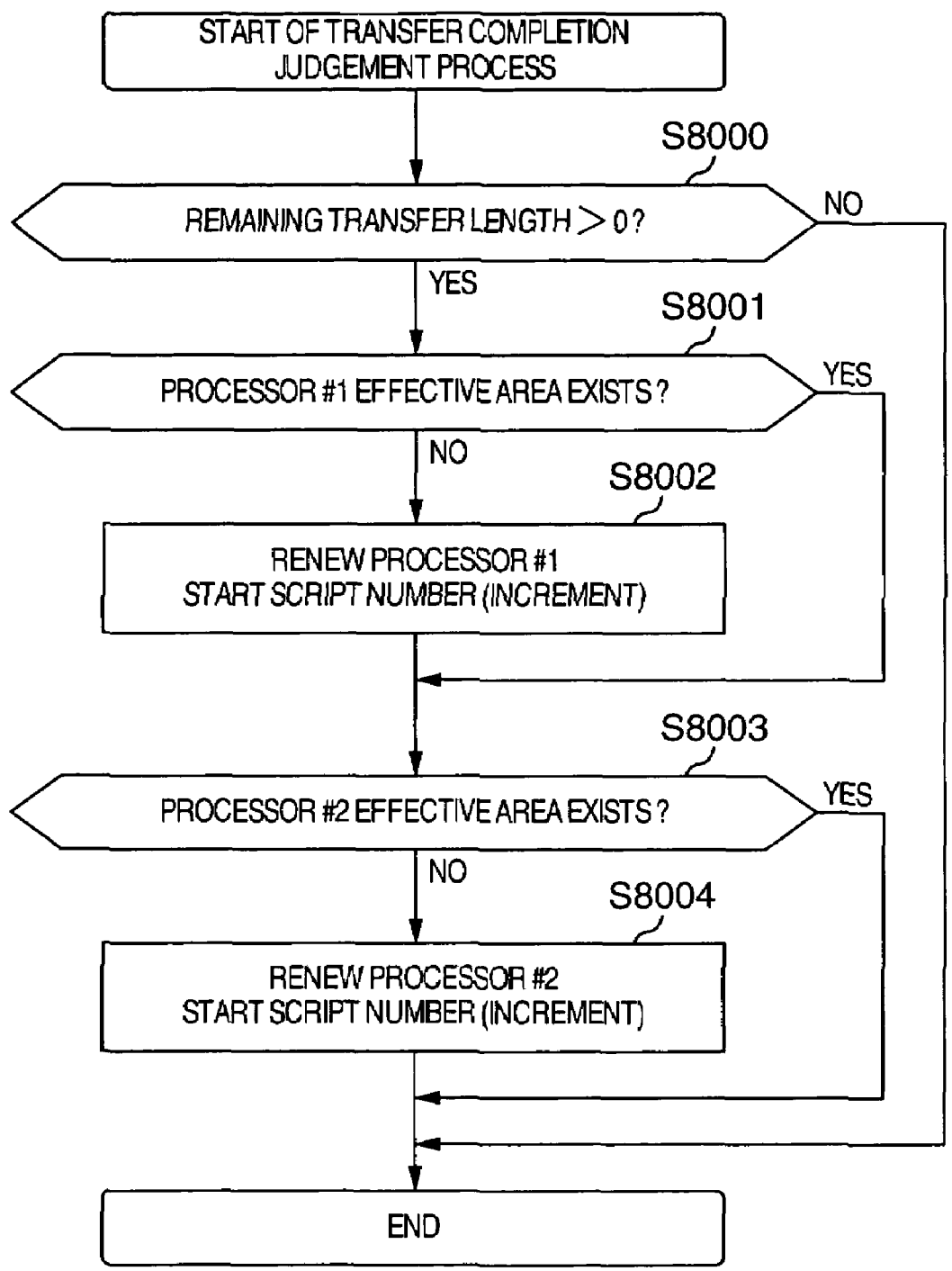
FIG. 29 is a flow chart illustrating the sequence of the data transfer process according to the first embodiment.

The transfer completion judgement process is performed in accordance with the flow chart shown in FIG. 29.

First, the DMA control unit 801 checks the remaining transfer length in the transfer register 804. If the remaining transfer length is 0, it means that all data of the request transfer length has been transferred completely, to follow "No" and terminate the process (S8000).

If the remaining transfer length is not 0, either the processor #1 effective area length or the processor #2 effective area length is 0. In this case, the script having the effective area length of 0 has the script coupled by the continuity Flag to be executed next. The processes S8001 to S8004 determine whether the script having the script coupled by the continuity Flag to be executed next is the processor #1 script or the processor #2 script.

First at S8001 it is checked whether the processor #1 effective area in the script register 806 is 0. If 0, the flow advances to "Yes" to renew the processor #1 start script number at S8002, whereas if not 0, the flow advances to "No".

Next it is checked whether the processor #2 effective area in the script register 806 is 0 (S8003). If 0, the flow advances to "Yes" to renew the processor #2 start script number at S8004, whereas if not 0, the flow advances to "No".

The DMA control unit 801 executes again S5000. In this case, the DMA control unit 801 reads the script designated by the processor #1 script number in the transfer start register 803 renewed at S8002 or S8004 or by the processor #2 script. In accordance with the newly read script, the DMA control unit 801 performs DMA transfer.

When the remaining transfer length in the transfer register 804 eventually takes 0 in the transfer completion judgement process at S5003, the DMA control unit 801 terminates the transfer process. The DMA control unit 801 writes a completion status describing the transfer process result into the memory #1 117 (S4007) and notifies a transfer completion to the processor #1 119 (S4008). This completion notice may be performed by transmitting an interrupt signal.

The processor #1 119 reads the completion status from the memory #1 117 (S4009) and executes a process corresponding to the contents of the completion status (S4009). The processor #1 119 transmits a completion notice to the processor #2 112 (S4010).

In response to this, the processor #2 112 reads the read data transferred to the data area of the memory #2 113 and transmits it to the information processing apparatus 200, if the data input/output request is the data read request. If the data input/output request is the data write request, a write completion report is transmitted to the information processing apparatus 200.

Figure 19:
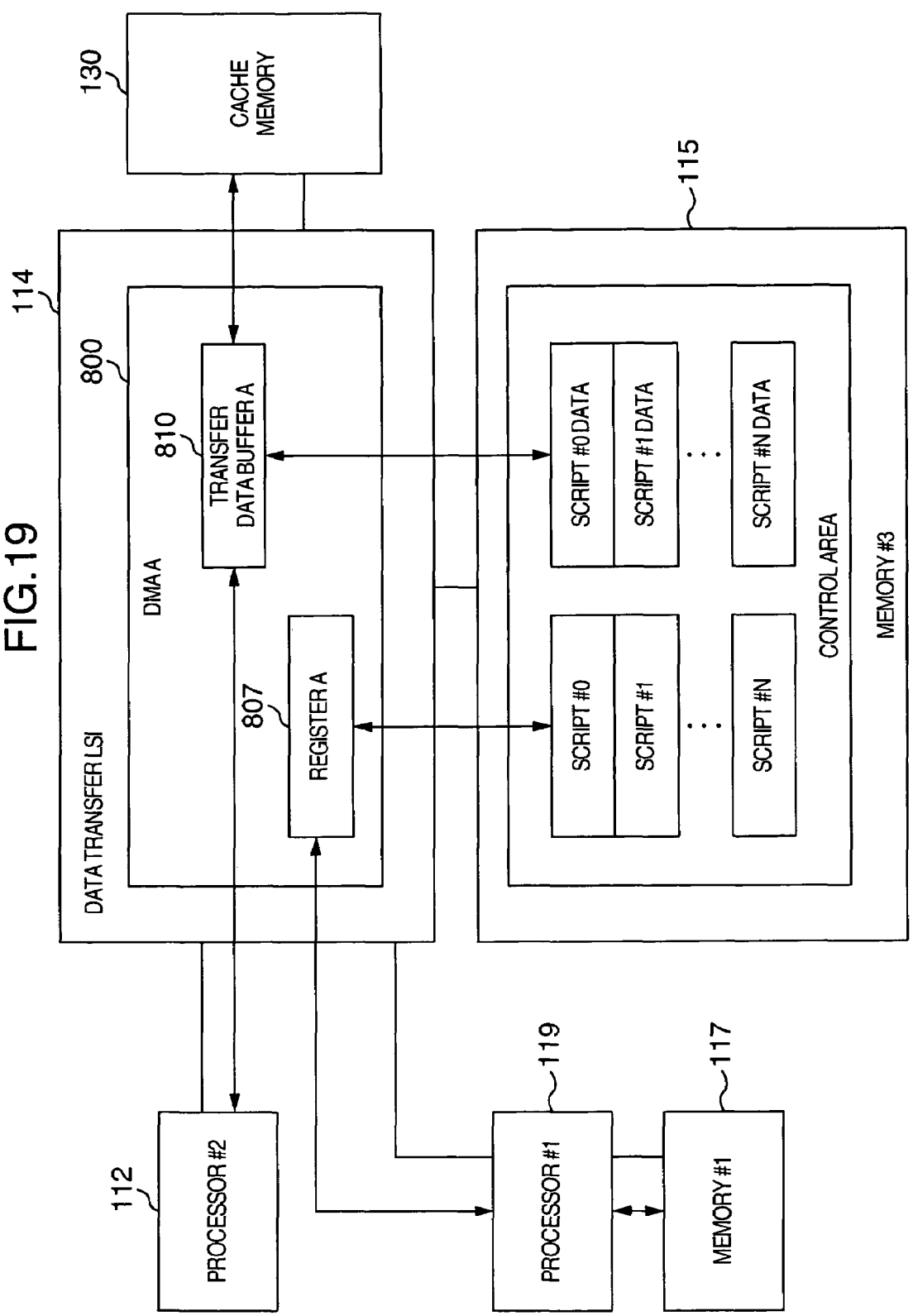
FIG. 19 is a block diagram illustrating data transfer according to the first embodiment.
Figure 20:
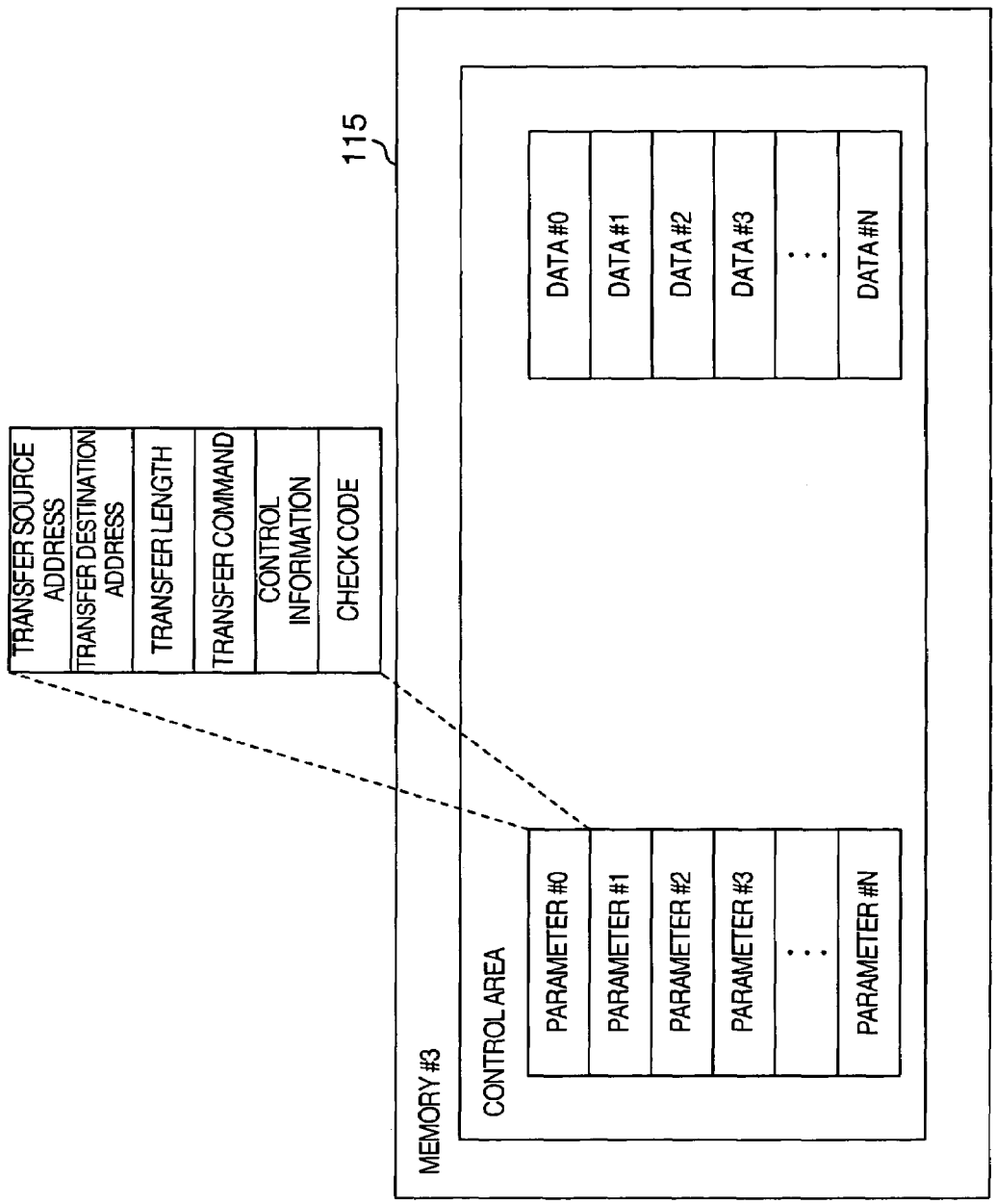
FIG. 20 is a diagram showing a memory #3 according to the first embodiment.

As described earlier, DMA 800 of this embodiment can control the memory #3 115. Therefore, data transfer information stored in the register 807 and the data stored in the transfer data buffer 810 can be written in or read from the memory #3 115. This operation is illustrated in FIGS. 19 and 20. The DMA control unit 801 controls the data read/write relative to the memory #3 115.

The storage control apparatus 100 of this embodiment can control the second data transfer basing upon the second data transfer information even while the first data transfer basing upon the first data transfer information is controlled. Namely, even during the control of the first data transfer, the second data transfer can be controlled by writing the first data transfer information stored in the register 807 and the data stored in the transfer data buffer 810 into the memory #3 115 and reading the second data transfer information from the memory #3 115 and writing it in the register 807. As shown in FIG. 20, the number of data transfer information and the number of data written in the memory #3 115 are not limited only to a single piece of information and data, but a plurality of information and data pieces may be written.

FIG. 20 draws at least some of the data transfer information to be written in the memory #3 115. The information drawn in FIG. 20 includes a "transfer source address", a "transfer destination address", a "transfer length", a "transfer command", "control information" and a "check code". The "transfer source address" and the "transfer destination address" are a transfer source address and a transfer destination address, respectively, stored in the transfer register 804. The "transfer length" may be a remaining transfer length stored in the transfer register 804 or a value obtained by subtracting the remaining transfer length from the request transfer length stored in the transfer start register 803. The "transfer command" may be a transfer direction stored in the transfer start register 803 or a data input/output request transmitted from the information processing apparatus 200 to the storage apparatus 100. In the latter case, DMA 800 is provided with a register for storing the data input/output request, and the data input/output request stored in the register is written in the memory #3 115. The "control information" may be various status information stored when the DMA control unit 801 controls the data transfer. The "check code" is an intermediate result of a check code calculated in accordance with the transferred data. The check code may be a check sum or Cyclic Redundancy Check (CRC).

Figure 21:
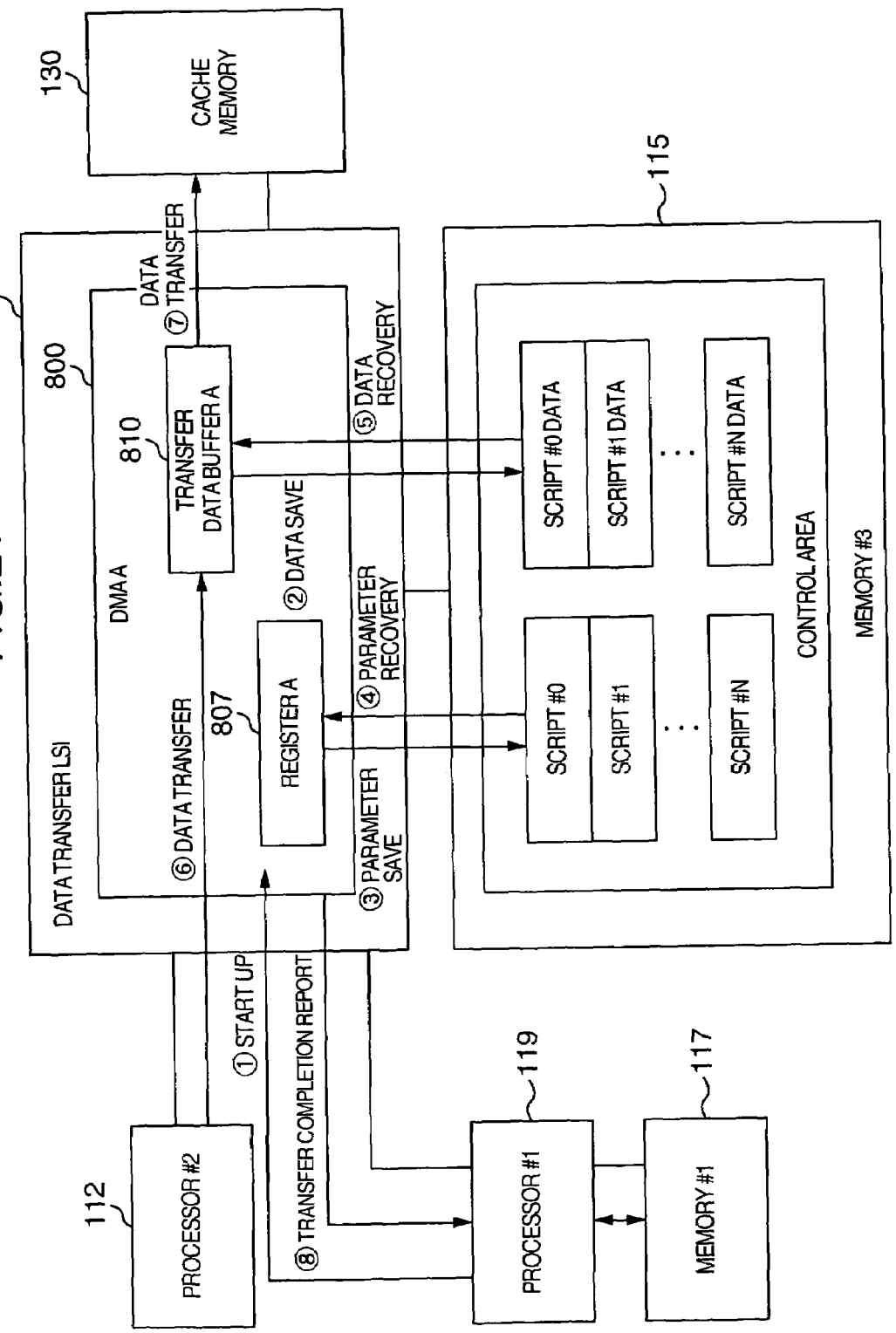
FIG. 21 is a block diagram showing the outline of data transfer according to the first embodiment.
Figure 22:
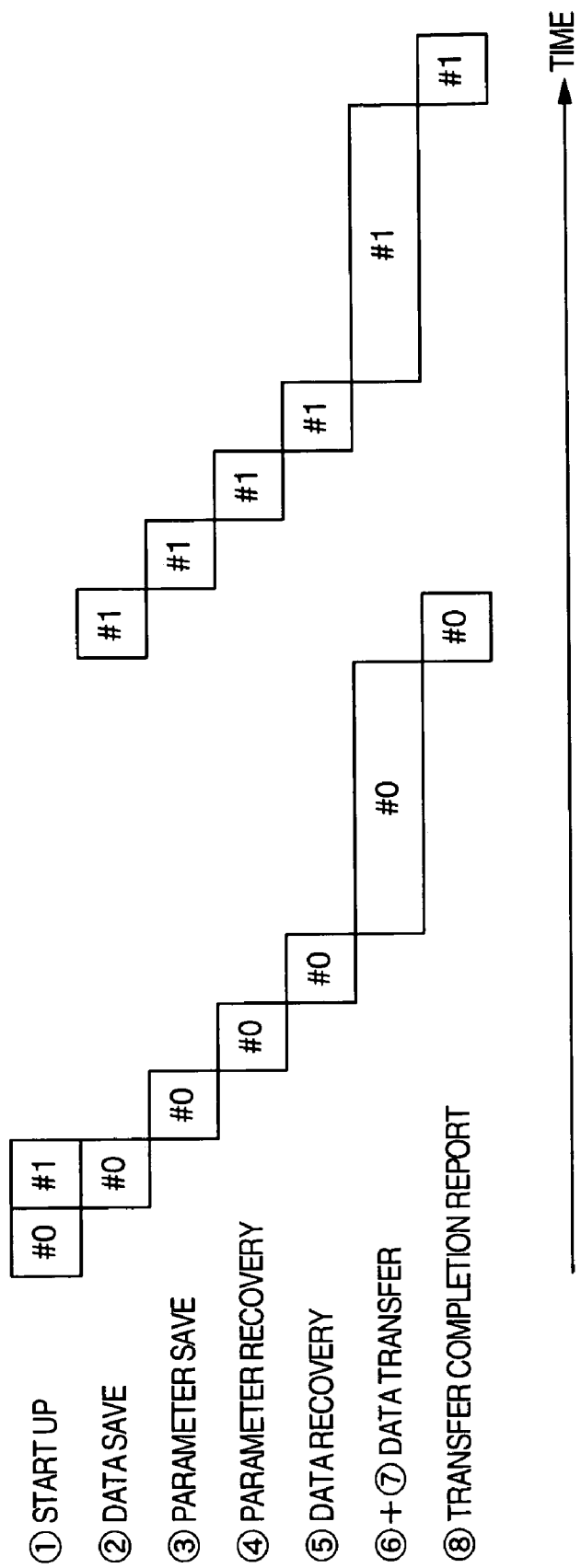
FIG. 22 is a flow chart illustrating the outline of data transfer according to the first embodiment.

By writing the data transfer information stored in the register 807 and the data stored in the transfer data buffer 810 into the memory #3 115, the second data transfer can be controlled basing upon the second data transfer information while the first data transfer is controlled basing upon the first data transfer information. With reference to FIGS. 21 and 22, description will be given on a flow of the process of controlling the second data transfer basing upon the second data transfer information while the first data transfer is controlled basing upon the first data transfer information.

Numerals surrounded by circles in FIGS. 21 and 22 indicate a process order. First, the processor #1 119 instructs DMA 800 to start the data transfer (starts up DMA 800). The DMA control unit 801 reads the first data transfer information stored in the register 807 and the data under data transfer stored in the transfer data buffer 810 and writes (saves) them into the memory #3 115. When the write operation is completed, the DMA control unit 801 reads the second data transfer information and the data corresponding to the second data transfer information from the memory #3 115 and writes them in the register 807 and transfer data buffer 810, respectively. The DMA control unit 801 performs the second data transfer via the transfer data buffer 810. When the second data transfer is completed, a completion notice is transmitted to the processor #1 119.

In this manner, the storage control apparatus 100 of this embodiment can perform the second data transfer without waiting for the completion of the first data transfer. For example, when a data read operation of reading data stored in the storage volume 310 of the storage apparatus B 600 from the storage apparatus A 600 is to be performed a plurality of times, it is possible to transmit the second data read request to the storage control apparatus B 100, before the data read in response to the first data read request transmitted from the storage control apparatus A 100 to the storage control apparatus B 100 is transmitted from the storage control apparatus B 100 to the storage control apparatus A 100, or before all the data blocks are transmitted completely even after the data is transmitted from the storage control apparatus B 100 to the storage control apparatus A 100. In this case, when the second data read request is transmitted, the first data transfer information corresponding to the first data read request is being stored in the register 807 of the data transfer LSI 114. However, since the first data transfer information is written in the memory #3 115, the second data transfer information corresponding to the second data read request is read into the register 807 to allow the second data transfer to be performed. When the data read from the storage volume 310 of the storage apparatus B 600 in response to the first data read request is to be received, the second data transfer information stored in the register 807 is written into the memory #3 115 and the first data transfer information written into the memory #3 115 is again read and written into the register 807 to allow the data for the first data transfer request to be received.

In this manner, another data transfer is possible during the transfer standby period of the data transfer between the storage control apparatus A 100 and the storage control apparatus B 100. Furthermore, even if read data is not stored in the cache memory 130 of the storage control apparatus B 100 (even if there is a cache mishit), another data transfer is possible while data is read from the storage volume B 310. It is therefore possible to improve data transfer throughput, so that the data input/output performance can be improved.

As described above, the memory #3 115 can be written with a plurality of data transfer information and data. It is therefore obvious that a third data read request can be transmitted to the storage control apparatus B 100 during the period while the data read in response to the second data transfer request is transmitted to the storage control apparatus A 100, to allow the data input/output to be performed at a higher multiplicity.

In this embodiment as described above, even if data stored in the storage apparatus B 600 connected via a communication path is accessed, data input/output is possible by hiding a data transfer delay time due to communications and by not lowering the performance.

If the data transfer is performed in the unit of data block, such as when communications between the storage apparatus A 600 and the storage apparatus B 600 are performed by the fibre channel protocol, the data transfer is performed in a mixed state of data blocks of the first data transfer and data blocks of the second data transfer. In a storage system having a plurality of storage apparatuses A 600 and storage apparatuses B 600, a larger number of blocks are transmitted in a mixed state. Even in such cases, in the storage control apparatus of this embodiment, transmission/reception of data blocks of the second data transfer can be performed during transmission/reception of data blocks of the first data transfer, by writing the data transfer information and data blocks of the first data transfer into the third memory #3 115. The first data transfer can be resumed by reading the data transfer information and data blocks of the first data transfer from the memory #3 115 after completion of the second data transfer.

Figure 7:
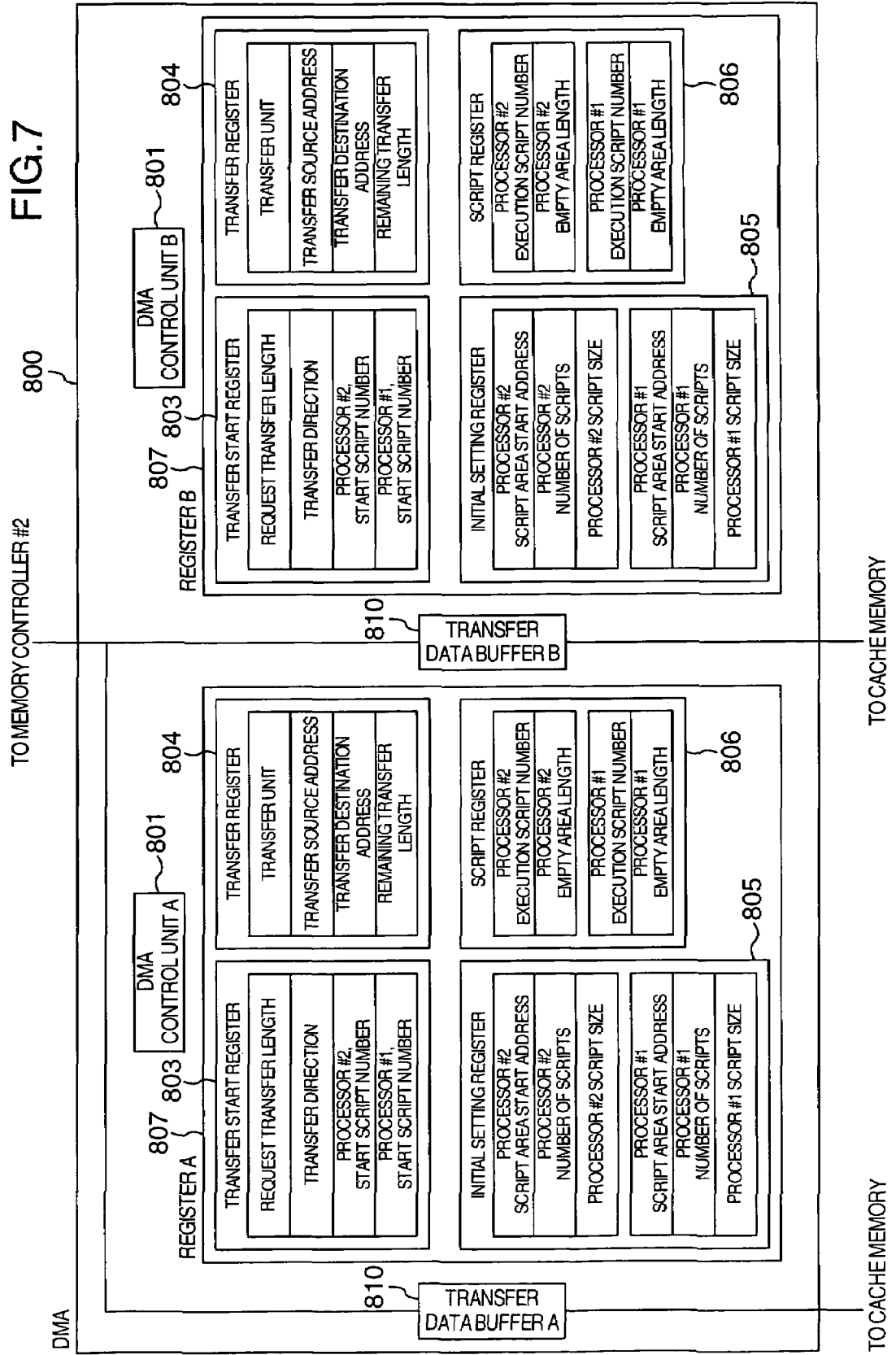
FIG. 7 is a block diagram showing the system configuration of DMA according to the first embodiment.

DMA 800 of this embodiment has, as shown in FIG. 7, two DMA control units 801, two transfer buffers 810 and two registers 807. Therefore, as will be described hereinunder, the storage control apparatus 100 of this embodiment can perform the data transfer in a more preferable state.

Figure 23:
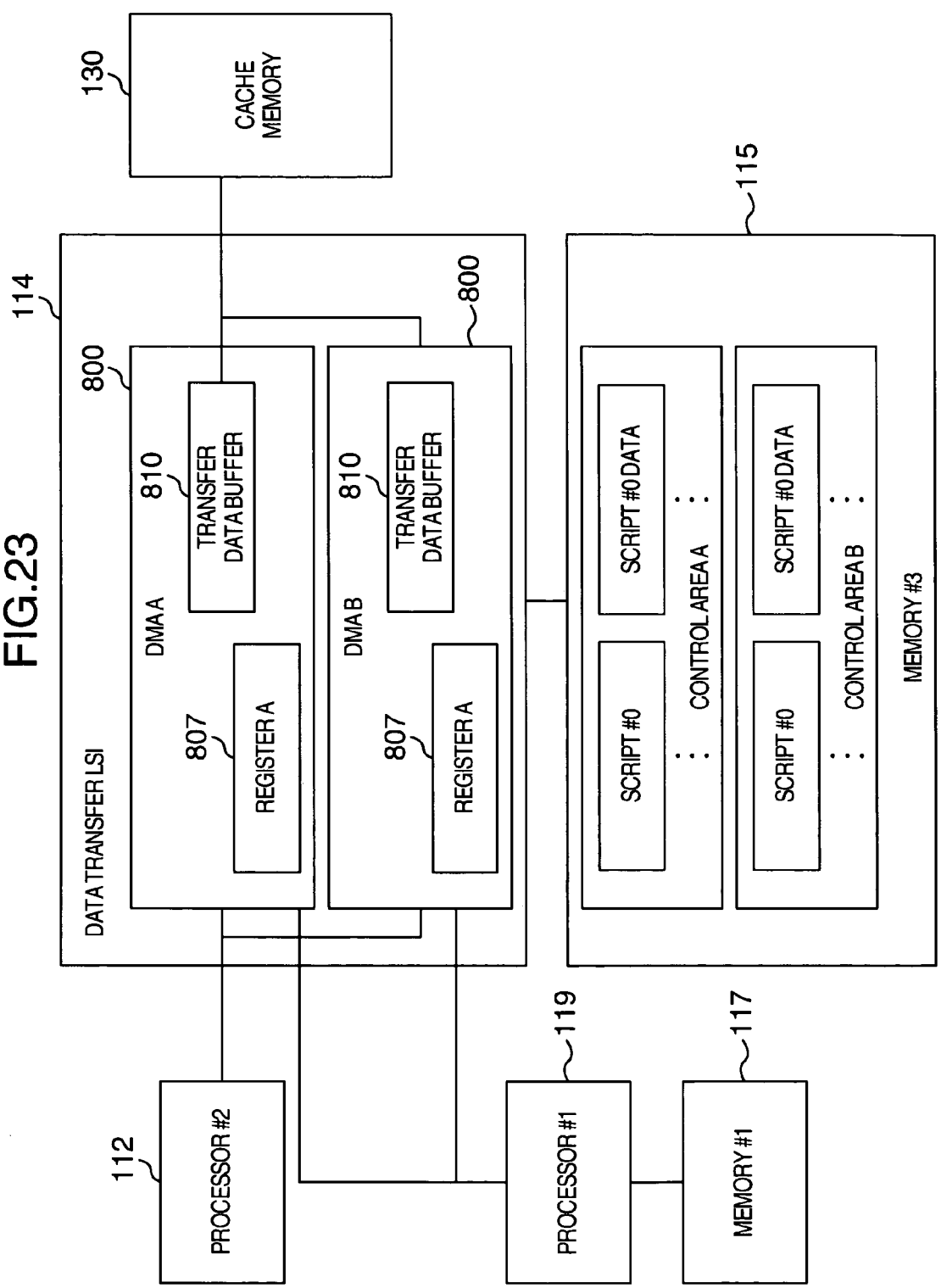
FIG. 23 is a block diagram showing the outline of data transfer according to the first embodiment.

Namely, as shown in FIG. 23, when data blocks of the second data transfer are transmitted/received during transmission/reception of data blocks of the first data transfer, prior to the completion of writing the first data transfer information stored in the register 807 of one DMA 800 and the data blocks during data transfer stored in the transfer data buffer 810 of the one DMA 800, into the memory #3 115, the second data transfer information and data blocks corresponding to the second data transfer information are read into the register 807 and transfer data buffer 810 of the other DMA 800. In this manner, without waiting for the completion of writing the first data transfer information stored in the register 807 and the data blocks during data transfer stored in the transfer data buffer 810, into the memory #3 115, the second transfer information and the data blocks corresponding to the second data transfer information are written in the resister 807 and transfer data buffer 810 of the other DMA 800, so that the second data transfer can be started more earlier. The data input/output process between the storage apparatus A 600 and storage apparatus B 600 can therefore be performed at higher speed.

Figure 24:
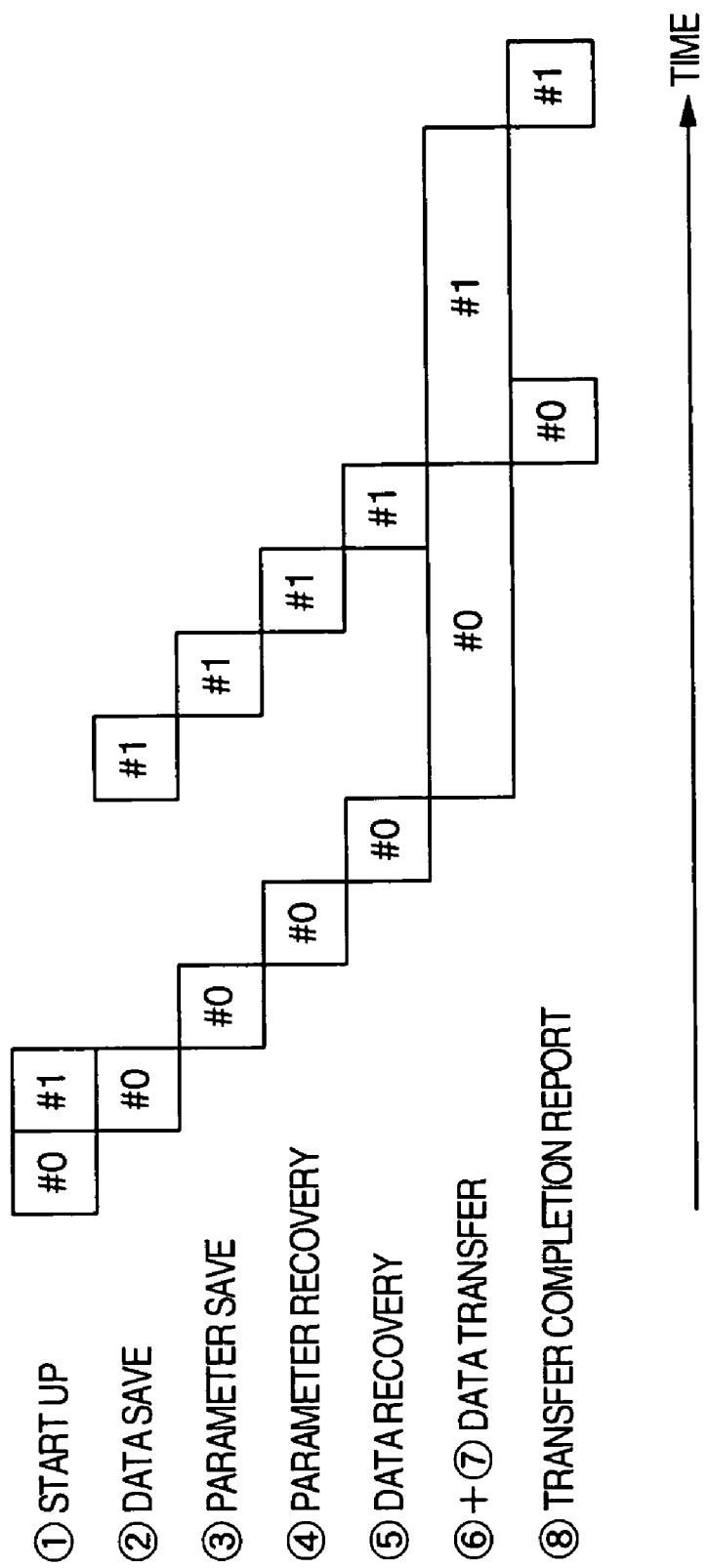
FIG. 24 is a flow chart illustrating the outline of data transfer according to the first embodiment.
Figure 25:
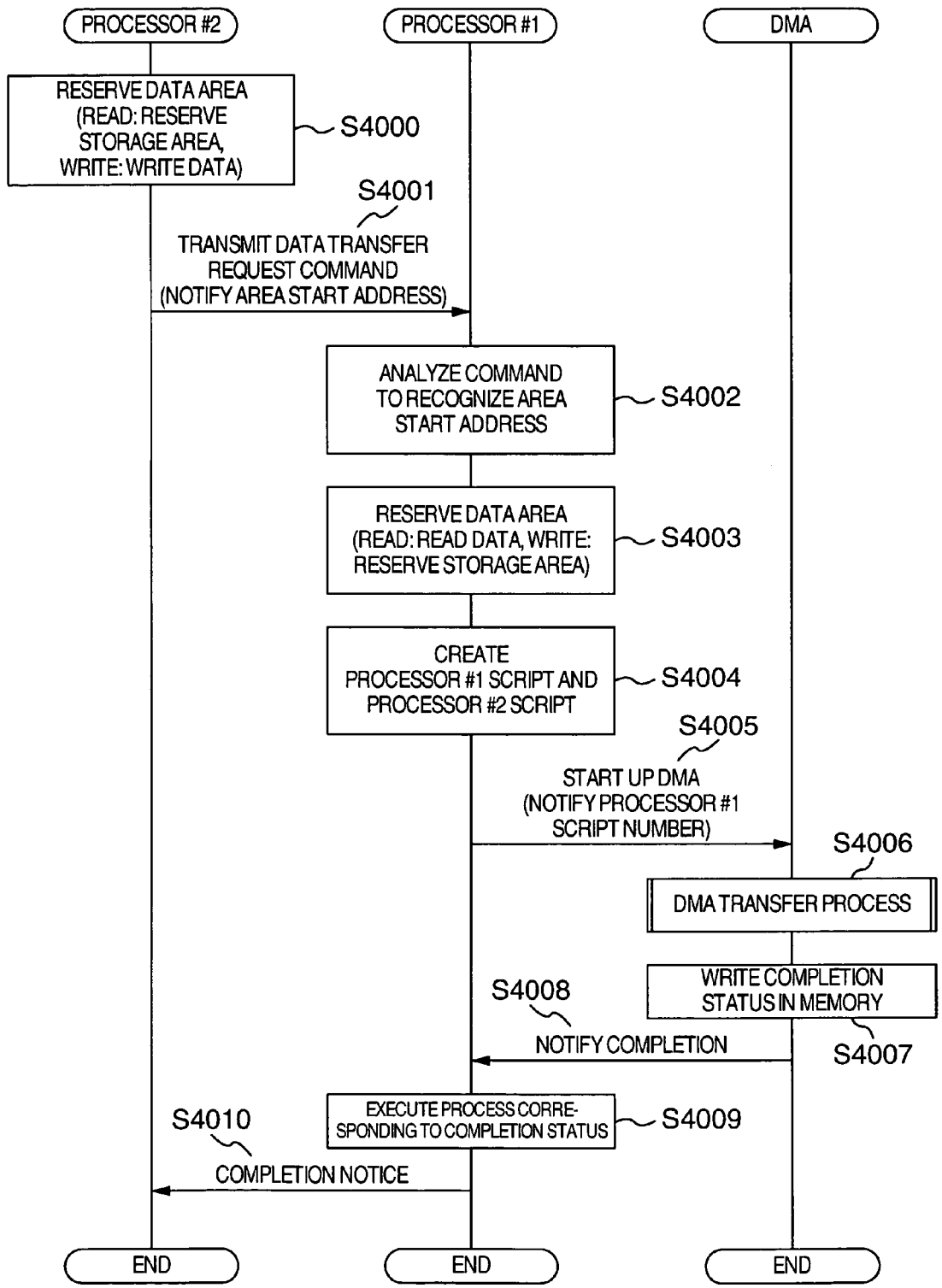
FIG. 25 is a flow chart illustrating the sequence of a data transfer process according to the first embodiment.
Figure 26:
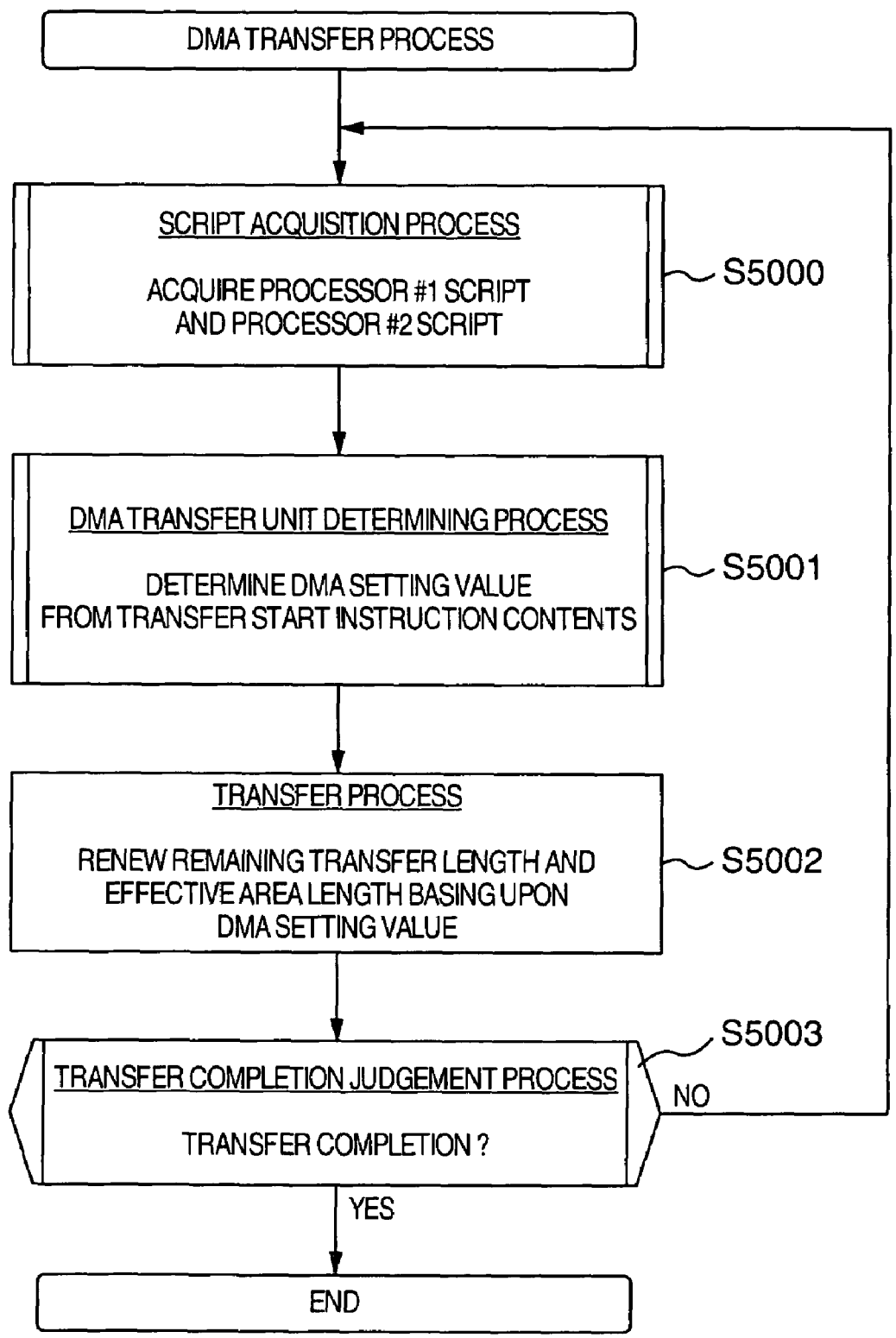
FIG. 26 is a flow chart illustrating the sequence of the data transfer process according to the first embodiment.
Figure 27:
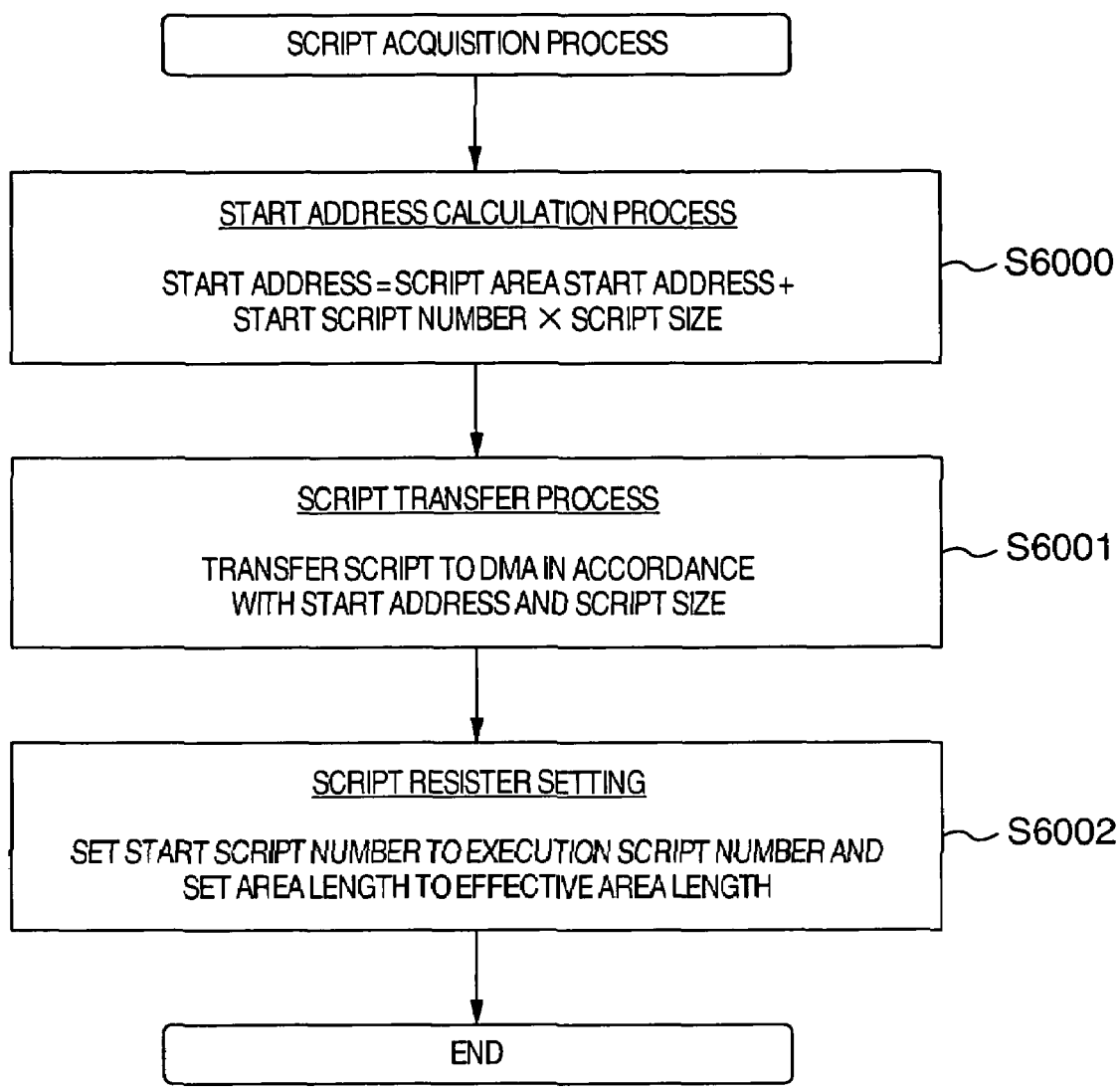
FIG. 27 is a flow chart illustrating the sequence of the data transfer process according to the first embodiment.
Figure 28:
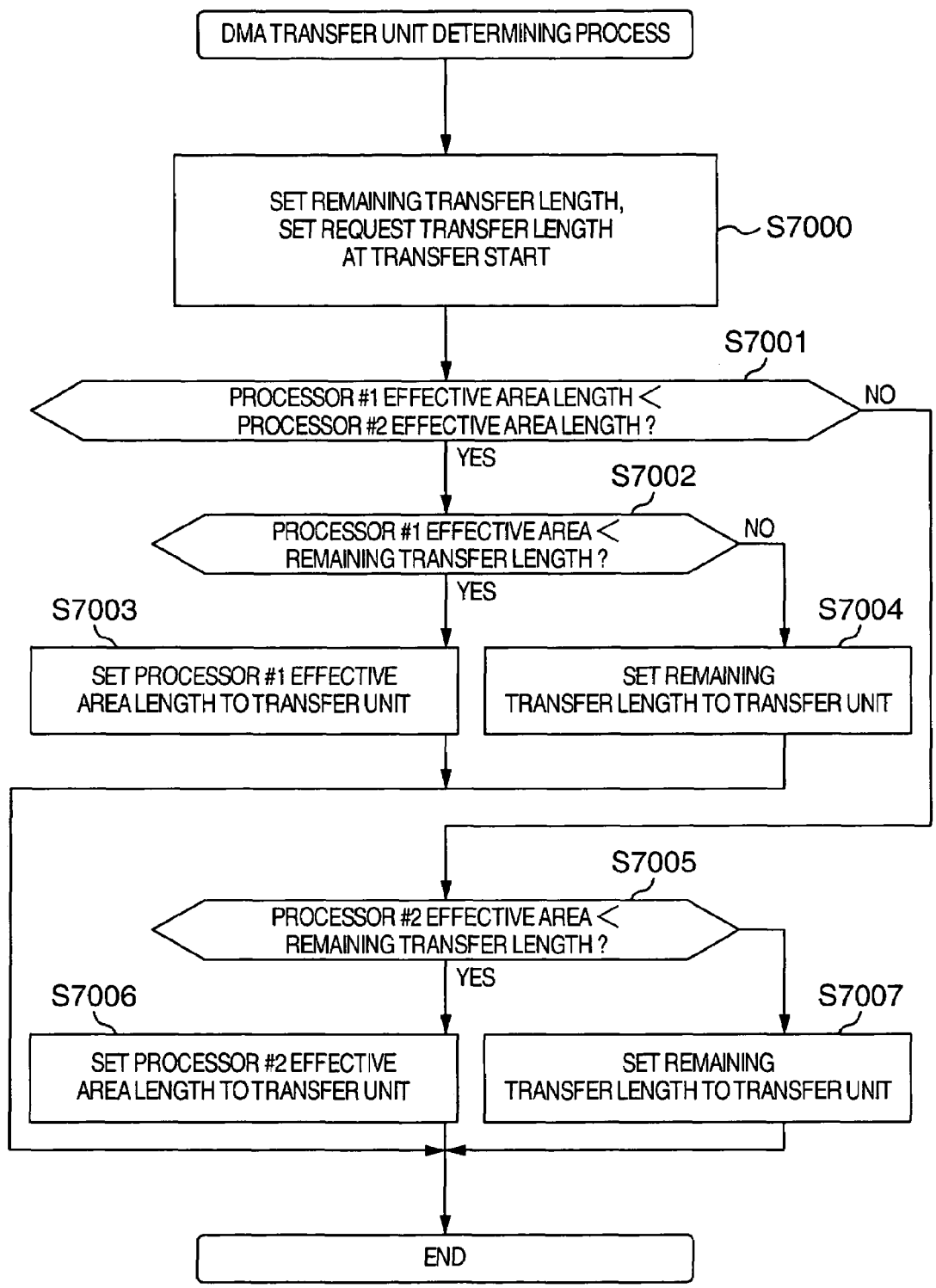
FIG. 28 is a flow chart illustrating the sequence of the data transfer process according to the first embodiment.

This operation state is illustrated in FIG. 24. Now compare FIGS. 22 and 24. FIG. 22 shows the operation state of switching between the first data transfer and second data transfer, in which one DAM control unit 801, one transfer data buffer 810 and one register 807 are provided. FIG. 24 shows the operation state of switching between the first data transfer and second data transfer according to the embodiment, in which two DAM control units 801, two transfer data buffers 810 and two register 807 are provided. As seen from this comparison, the data transfer LSI 114 can hide the DMA transfer switching overhead because the data transfer LSI 114 of this embodiment is structured to have two DAM control units 801, two transfer data buffers 810 and two register 807. The data input/output process between the storage apparatus A 600 and storage apparatus B 600 can be performed at higher speed.

Second Embodiment

Next, the second embodiment will be described. In the second embodiment, the communication interface function of the channel control unit 110 is realized by a protocol Large-Scale Integrated (LSI) circuit 112.

Figure 30:
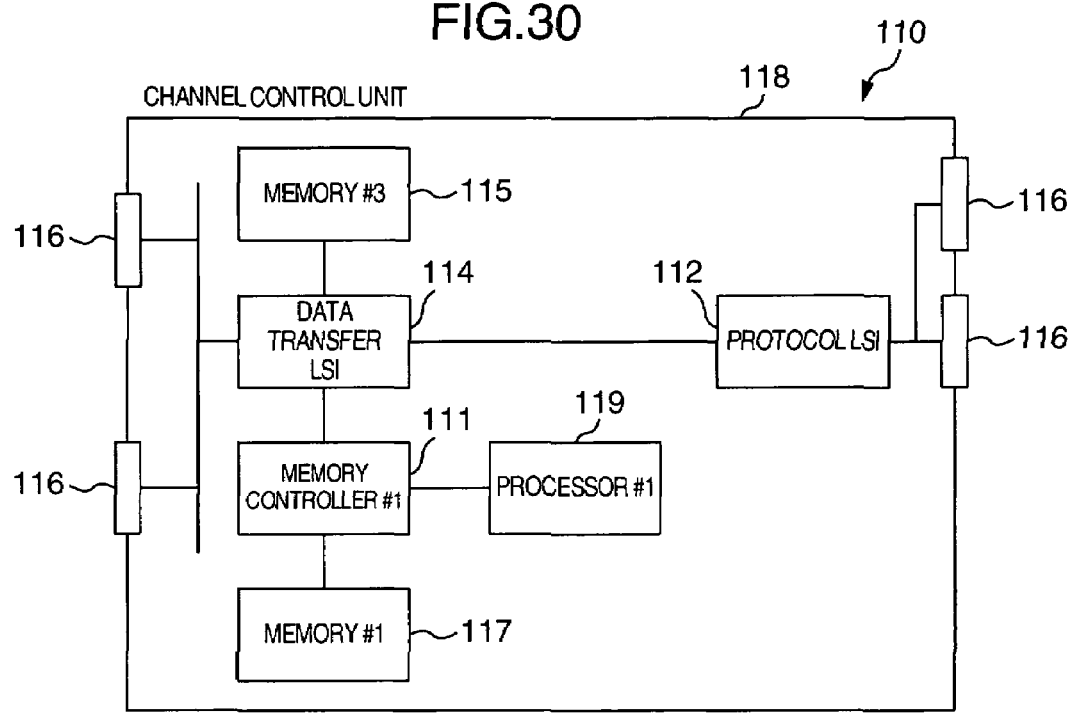
FIG. 30 is a block diagram showing the structure of a channel control unit according to a second embodiment of the invention.

FIG. 30 shows the structure of the channel control unit 110 of the second embodiment.

The channel control unit 110 is structured as a circuit board 118 of one unit board. The channel control unit 110 may have one or a plurality of circuit boards 118. The circuit board 118 has a processor #1 119, a protocol LSI 112, a data transfer LSI 114, a memory #1 117, a memory controller #1 111, a memory #3 115 and connectors 116.

The processor #1 119, protocol LSI 112, data transfer LSI 114, memory #1 117, memory controller #1 111 and memory #3 115 are connected to a Peripheral Component Interconnect (PCI) bus to be capable of mutual communications. It is not always necessary that they are connected to the PCI bus, but some or all of them may be structured in conformity with another standard. The memory #1 117, memory #3 115 and memory controller #1 111 constitute the second memory. The data transfer LSI 114 and protocol LSI 112 constitute the data transfer control unit. The processor #1 119 constitutes the input/output control unit.

The protocol LSI 112 provides a communication interface function for communications with the information processing apparatus 200 and another storage apparatus 600. For example, data is converted into the data format in conformity with the fibre channel protocol and transmitted to another storage apparatus 600. The connectors 116 connected to the protocol LSI 112 are used for communications with the information processing apparatus 200 and another storage apparatus 600. The protocol LSI 112 controls to realize the communication interface function. Data transferred to and from the information processing apparatus 200 and another storage apparatus 600 is stored in a buffer memory built in the protocol LSI 112.

The protocol LSI 112 and connectors 116 also function as a port to be connected to the port of the fibre channel switch constituting SAN 500. Although well known in the fibre channel technical field, the port is assigned a WWN which is an identifier for identifying the equipment on SAN 500.

The processor #1 119 executes a control program 700 stored in the memory #1 117 to control the whole of the channel control unit 110. For example, a data input/output request transmitted from the information processing apparatus 200 is analyzed to judge whether the request is directed either to the storage driver apparatus A 300 or to the storage driver apparatus B 300. If the request is directed to the storage driver apparatus A 300, it is judged whether a remote copy is necessary. The processor #1 119 performs other judgements, and in accordance with the judgement results, a data transfer instruction is given to the data transfer LSI 114.

In response to an instruction from the processor #1 119, the data transfer LSI 114 controls as a PCI bus target the data transfer between the cache memory 130 and the information processing apparatus 200 or storage apparatus B 600. More specifically, in response to an instruction from the processor #1 119, the data transfer LSI 114 reads data transfer information from the memory #1 117 to conduct data transfer through an access to the PCI bus. The data transfer information is written by the processor #1 119 in the memory #1 117 and includes the storage location of data in the cache memory 130 and the storage location of the data in the information processing apparatus 200, storage control apparatus B 100 or storage apparatus B 600.

Data Transfer

Next, description will be made on data transfer by the channel control unit 110 of the second embodiment between the cache memory 130 and the information processing apparatus 200 or storage control apparatus B 100.

Figure 31:
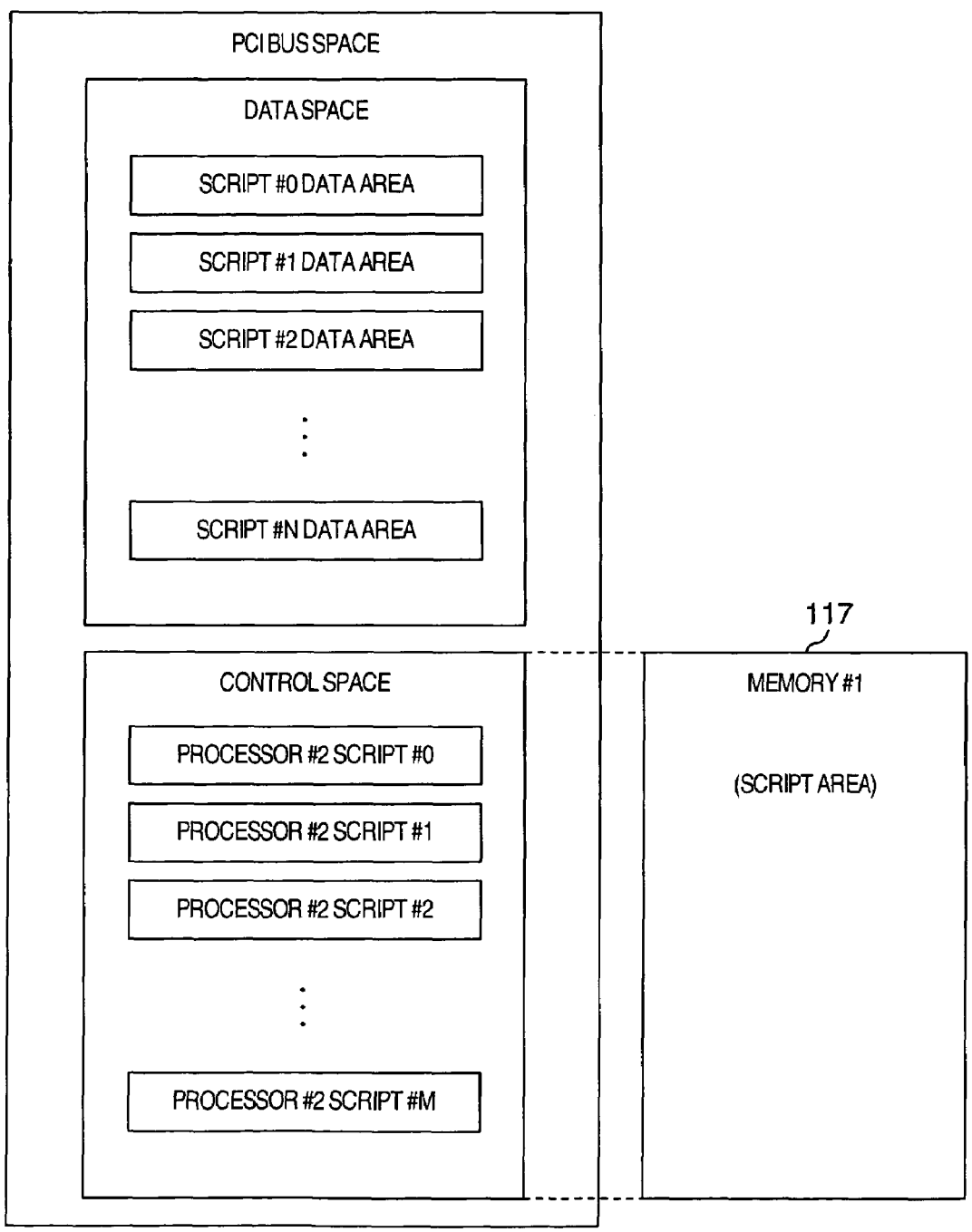
FIG. 31 is a diagram showing a memory space for a protocol LSI according to the second embodiment.

FIG. 31 shows the PCI bus space as viewed from the protocol LSI 112. The PCI bus space of the protocol LSI 112 has a data space and a control space. The control space is physically formed in the script area of the memory #1 117 shown in FIG. 9.

The data space of the PCI bus stores data to be transferred to the cache memory 130 or data transferred from the cache memory 130. The control space of the PCI bus stores the storage location of each data stored in the data space, the size (area length) of the storage area of each data, and the like, as the processor #2 script (data transfer information) of each data. The processor #2 script is similar to the processor #2 script of the first embodiment. The processor #2 script is set by the processor #1 119 and written in the control space of the PCI bus space of the protocol LSI 112, i.e., in the script area of the memory #1 117.

Similar to the first embodiment as shown in FIG. 10, the data area of the cache memory 130 of the second embodiment stores data to the transferred to the data space of the PCI bus space or data transferred from the data space of the PCI bus space. As shown in FIG. 9, the storage location of each data stored in the data area of the cache memory 130, the size (area length) of the storage area of each data and the like are stored in the script area of the memory #1 117 as the processor #1 script (data transfer information) for each data. The processor #1 script is similar to the processor #1 script of the first embodiment. The processor #1 script stored in the memory #1 117 is set by the processor #1 119 and written in the script area of the memory #1 117.

Data Transfer Flow

Figure 32:
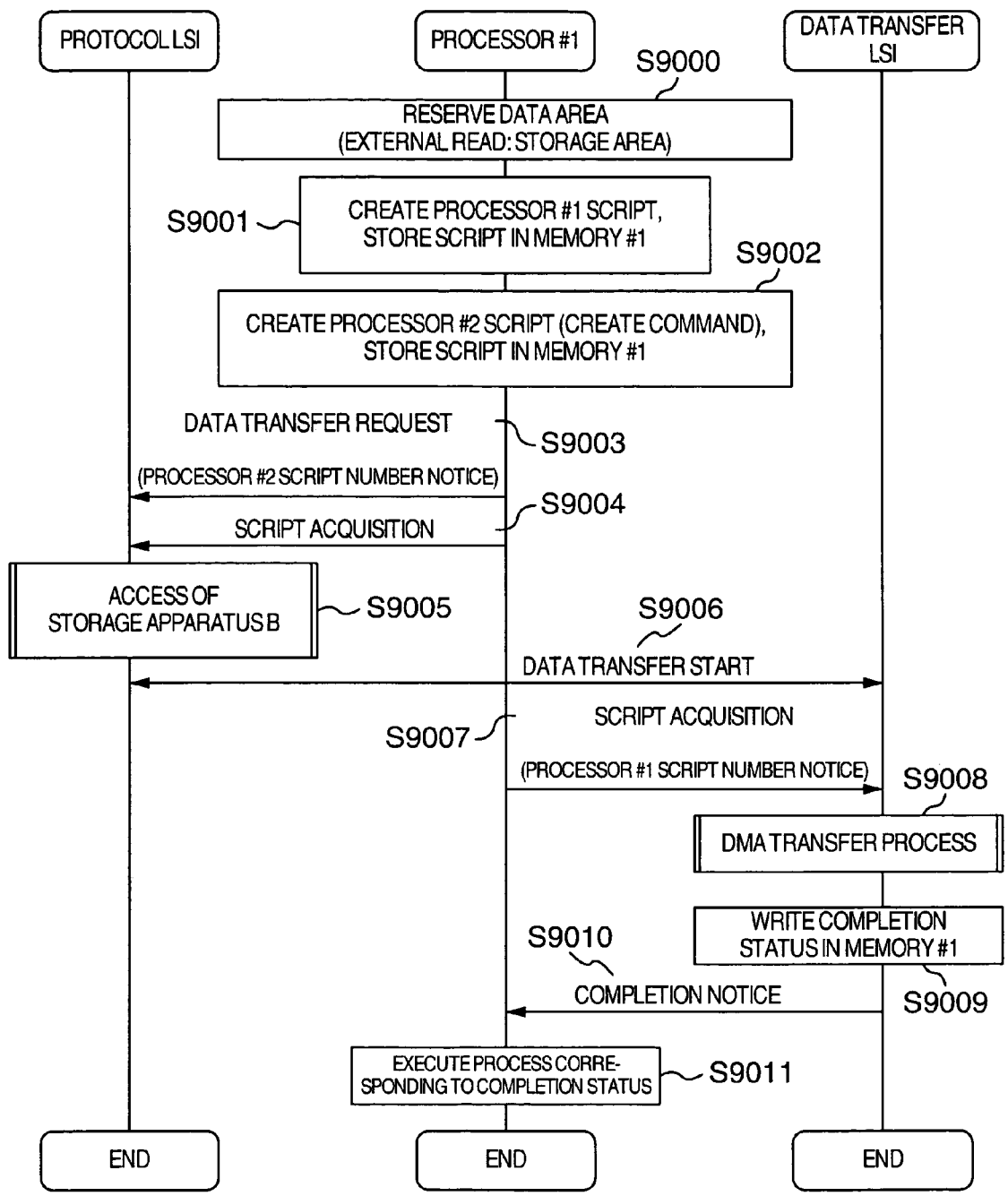
FIG. 32 is a flow chart illustrating the sequence of a data transfer process according to the second embodiment.

Next, with reference to the flow chart of FIG. 32, description will be made on the flow of a data transfer process according to the second embodiment, by taking as an example when the storage apparatus A 600 receives a data read request for data stored in the storage apparatus B 600 from the information processing apparatus 200.

When the storage control apparatus A 100 receives a data read request from the information processing apparatus 200, the processor #1 119 reserves the data area in the memory #1 117 and cache memory 130 (S9000). Reserving the data area in the memory #1 117 means that the storage area for storing the processor #1 script and processor #2 script is reserved in the memory #1 117. Reserving the data area in the cache memory 130 means that the storage area for storing read data is reserved in the cache memory 130. A plurality of reserved data areas may be reserved.

The processor #1 119 creates a processor #1 script. The processor #1 script has the address of the cache memory 130 as a data transmission destination address. The created processor #1 script is stored in the memory #1 117 (S9001). Next, the processor #1 119 creates a processor #2 script and stores it in the memory #1 117 (S9002). The processor #2 script has the PCI address as a data transmission source address.

The processor #1 119 transmits the processor #2 script number to the protocol LSI 112 to perform the i data transfer request (S9003).

In response to this, the protocol LSI 112 reads the processor #2 script from the memory #1 117 (S9004) to communicate with the storage apparatus B 600 via SAN 500 (S9005). With the communications, the protocol LSI 112 transmits a data read request to the storage apparatus B 600. After the read data is transmitted from the storage apparatus B 600, the protocol LSI 112 transmits the read data by using the PCI address as the transmission destination (S9006).

The processor #1 119 transmits the processor #1 script number to the data transfer LSI 114. In accordance with the processor #1 script number, the data transfer LSI 114 reads the processor #1 script from the memory #1 114 (S9007). In response to the PCI bus operation, the data transfer LSI 114 starts the DMA transfer to the cache memory 130 in accordance with the processor #1 script (S9008). The DMA transfer process is similar to the process illustrated in the flow charts of FIGS. 26 to 29.

After the DMA transfer process, the DMA control unit 801 writes the completion status describing the transfer process result into the memory #1 117 (S9009) and sends a completion notice to the processor #1 119 (S9010). This completion notice may be performed by transmitting an interrupt signal.

The processor #1 119 reads the completion status from the memory #1 117 and executes a process corresponding to the contents of the completion status (S9011).

Similar to DMA 800 of the first embodiment, DMA of the second embodiment can control the memory #3 115. Therefore, the data transfer information stored in the register 807 and the data stored in the transfer data buffer 810 can be written in or read from the memory #3 115. Also in the storage control apparatus 100 of the second embodiment, the second data transfer basing upon the second data transfer information can be controlled even while the first data transfer basing upon the first data transfer information is controlled.

For example, the process at S9005, i.e., an access to the storage apparatus B 600 by the protocol LSI 112, takes a relatively long time. During this period, a plurality of data read requests can be transmitted to the storage apparatus B 600. It is also possible to receive a plurality of read data transmitted from the storage apparatus B 600 in response to each data read request. In this case, a plurality of divided data (data blocks) can be received for one data read request.

When a data read operation of reading data stored in the storage volume 310 of the storage apparatus B 600 from the storage apparatus A 600 is to be performed a plurality of times, it is possible to transmit the second data read request to the storage control apparatus B 100, before the data read in response to the first data read request transmitted from the storage control apparatus A 100 to the storage control apparatus B 100 is transmitted from the storage control apparatus B 100 to the storage control apparatus A 100, or before all the data blocks are transmitted completely even after the data is transmitted from the storage control apparatus B 100 to the storage control apparatus A 100. In this case, when the second data read request is transmitted, the first data transfer information corresponding to the first data read request is being stored in the register 807 of the data transfer LSI 114. However, since the first data transfer information is written in the memory #3 115, the second data transfer information corresponding to the second data read request is read into the register 807 to allow the second data-transfer to be performed. When the data read from the storage volume 310 of the storage apparatus B 600 in response to the first data read request is to be received, the second data transfer information stored in the register 807 is written into the memory #3 115 and the first data transfer information written into the memory #3 115 is again read and written into the register 807 to allow the data for the first data transfer request to be received.

In this manner, another data transfer is possible during the transfer standby period of the data transfer between the storage control apparatus A 100 and the storage control apparatus B 100. Furthermore, even if read data is not stored in the cache memory 130 of the storage control apparatus B 100 (even if there is a cache mishit), another data transfer is possible while data is read from the storage volume B 310. It is therefore possible to improve data transfer throughput, so that the data input/output performance can be improved.

As described above, the memory #3 115 can be written with a plurality of data transfer information and data. It is therefore obvious that a third data read request can be transmitted to the storage control apparatus B 100 during the period while the data read in response to the second data transfer request is transmitted to the storage control apparatus A 100, to allow the data input/output to be performed at a higher multiplicity.

In the second embodiment as described above, even if data stored in the storage apparatus B 600 connected via a communication path is accessed, data input/output is possible by hiding a data transfer delay time due to communications and by not lowering the performance.

If the data transfer is performed in the unit of data block, such as when communications between the storage apparatus A 600 and the storage apparatus B 600 are performed by the fibre channel protocol, the data transfer is performed in a mixed state of data blocks of the first data transfer and data blocks of the second data transfer. In a storage system having a plurality of storage apparatuses A 600 and storage apparatuses B 600, a larger number of blocks are transmitted in a mixed state. Even in such cases, in the storage control apparatus of the second embodiment, transmission/reception of data blocks of the second data transfer can be performed during transmission/reception of data blocks of the first data transfer, by writing the data transfer information and data blocks of the first data transfer into the third memory #3 115. The first data transfer can be resumed by reading the data transfer information and data blocks of the first data transfer from the memory #3 115 after completion of the second data transfer.

DMA 800 of the second embodiment has also two DMA control units 801, two transfer buffers 810 and two registers 807. Therefore, also in the storage control apparatus of the second embodiment, when data blocks of the second data transfer are transmitted/received during transmission/reception of data blocks of the first data transfer, prior to the completion of writing the first data transfer information stored in the register 807 of one DMA 800 and the data blocks under data transfer stored in the transfer data buffer 810 of the one DMA 800, into the memory #3 115, the second data transfer information and data blocks corresponding to the second data transfer information are read into the register 807 and transfer data buffer 810 of the other DMA 800. In this manner, without waiting for the completion of writing the first data transfer information stored in the register 807 and the data blocks during data transfer stored in the transfer data buffer 810, into the memory #3 115, the second data transfer information and the data blocks corresponding to the second data transfer information are written in the resister 807 and transfer data buffer 810 of the other DMA 800, so that the second data transfer can be started more earlier. The data input/output process between the storage apparatus A 600 and storage apparatus B 600 can therefore be performed at higher speed.

The invention has been described in connection with the embodiment. The embodiments are used to make it easy to understand the invention, and are not construed to limit the present invention. Modifications and improvements are possible without departing from the spirit and scope of the invention, and the invention also includes equivalents of the embodiments.

We claim:

1. A storage control apparatus in a storage system comprising a first storage control apparatus for receiving a data input/output request from an information processing apparatus and performing a data input/output process relative to a first storage volume for storing data and a second storage control apparatus connected to said first storage control apparatus in a communication enable state for performing a data input/output process relative to a second storage volume for storing data, said first storage control apparatus comprises:
a first memory for storing data transferred between said first storage control apparatus and said second storage control apparatus;
a second memory;
an input/output control unit for writing data transfer information in said second memory, said data transfer information containing a storage location of data in said first memory and a storage location of data in said second storage control apparatus; and
a data transfer control unit having a data buffer for storing data and a data transfer register for storing said data transfer information, said data transfer control unit controlling data transfer between said first memory and said second storage control apparatus via said data buffer in accordance with said data transfer information read from said second memory and written in said data transfer register,
wherein, when a second data transfer based on second data transfer information is controlled while a first data transfer based on first data transfer information is controlled, said data transfer control unit writes said first data transfer information stored in said data transfer register and data stored in said data buffer into said second memory, reads said second data transfer information from said second memory, writes said second data transfer information in said data transfer register, and in accordance with said second data transfer information, controls said second data transfer.

2. A storage control apparatus according to claim 1, wherein:
said data transfer control unit comprises a plurality of said data buffers and a plurality of said data transfer registers; and
when a second data transfer based on second data transfer information is controlled while a first data transfer based on first data transfer information is controlled, said data transfer control unit reads said second data transfer information from said second memory, writes said second data transfer information into a second data transfer register, and in accordance with the second data transfer information, controls said second data transfer before said first data transfer information and data to be transmitted and received by said first data transfer are read from a first data transfer register storing said first data transfer information and a first data buffer storing the data to be transmitted and received by said first data transfer and written in said second memory.

3. A storage control apparatus according to claim 1, wherein said data transfer is controlled in a unit of each data block obtained by dividing data to be transferred between said first storage control apparatus and said second control apparatus into at least one or more data.

4. A storage control apparatus according to claim 1, wherein said first storage control apparatus is connected to said second storage control apparatus in a communication enable state via at least one or more switches.

5. A storage control apparatus according to claim 1, wherein:
when said data input/output request relative to said second storage volume is received from said information processing apparatus, said data transfer information is written in said second memory; and
said data transfer control unit reads said data transfer information from said second memory, writes said data transfer information in said data transfer register, and in accordance with said read data transfer information, controls data transfer between said first memory and said second storage control apparatus.

6. A storage control apparatus according to claim 1, wherein:

when a data write request relative to said first storage volume and write data are received from said information processing apparatus, said input/output control unit writes said data transfer information in said second memory in order to write a copy of said write data into said second storage volume; and said data transfer control unit reads said data transfer information from said second memory, writes said data transfer information into said data transfer register, and in accordance with said read data transfer information, controls transmission of said write data from said first memory to said second storage control apparatus.

7. A storage control apparatus according to claim 1, further comprising:

a channel control unit having a circuit board formed with said second memory, said input/output control unit and said data transfer control unit;

a cache memory unit having a circuit board formed with said first memory; and a disk control unit for reading/writing data relative to said first storage volume, wherein:

said first memory stores data to be transmitted and received at least between said first storage control apparatus and said information processing apparatus or said second storage control apparatus;

said input/output control unit writes data transfer information in said second memory, said data transfer information containing the storage location of data in said first memory and a storage location of data in said information processing apparatus or said second storage apparatus; and said data transfer control unit controls data transfer between said first memory and said information processing apparatus or said second storage control apparatus via said data buffer in accordance with said data transfer information read from said second memory and written in said data transfer register.

8. A storage control apparatus for a storage system comprising a first storage control apparatus for receiving a data input/output request from an information processing apparatus and performing a data input/output process relative to a first storage volume for storing data and a second storage control apparatus connected to said first storage control apparatus in a communication enable state via at least one or more switches for performing a data input/output process relative to a second storage volume for storing data, said first storage control apparatus comprises:

a cache memory unit having a circuit board formed with a first memory for storing data transferred at least between said first storage apparatus and said information processing apparatus or said second storage control apparatus;

a second memory;

an input/output control unit for writing data transfer information in said second memory, said data transfer information containing a storage location of data in said first memory and a storage location of data in said information processing apparatus or said second storage control apparatus;

a channel control unit having a circuit board formed with a data transfer control unit, said data transfer control unit having a plurality of data buffers for storing data and a plurality of data transfer registers for storing said data transfer information, and controlling data transfer between said first memory and said information processing apparatus or said second storage control apparatus via said data buffer in accordance with said data transfer information read from said second memory and written in said data transfer register; and a disk control unit for reading/writing data relative to said first storage volume, wherein, when a second data transfer based on second data transfer information is controlled while a first data transfer based on first data transfer information is controlled, said data transfer control unit reads said second data transfer information from said second memory, writes said second data transfer information into a second data transfer register, and in accordance with the second data transfer information, controls said second data transfer before said first data transfer information and data to be transmitted and received by said first data transfer are read from a first data transfer register storing said first data transfer information and a first data buffer storing the data to be transmitted and received by said first data transfer and written in said second memory.

9. A method of controlling a storage control apparatus in a storage system comprising:

receiving, by a first storage control apparatus in said storage control apparatus, a data input/output request from an information processing apparatus;

performing, by the first storage apparatus, a data input/output process relative to a first storage volume for storing data; and performing a data input/output process relative to a second storage volume for storing data, by a second storage control apparatus connected to said first storage control apparatus in a communication enable state, said second storage control apparatus being in said storage control apparatus;

said first storage control apparatus comprises:

a first memory for storing data transferred between said first storage control apparatus and said second storage control apparatus;

a second memory;

an input/output control unit for writing data transfer information in said second memory, said data transfer information containing a storage location of data in said first memory and a storage location of data in said second storage control apparatus; and a data transfer control unit having a data buffer for storing data and a data transfer register for storing said data transfer information, said data transfer control unit controlling data transfer between said first memory and said second storage control apparatus via said data buffer in accordance with said data transfer information read from said second memory and written in said data transfer register, wherein, when a second data transfer based on second data transfer information is controlled while a first data transfer based on first data transfer information is controlled, said data transfer control unit writes said first data transfer information stored in said data transfer register and data stored in said data buffer into said second memory, reads said second data transfer information from said second memory, writes said second data transfer information in said data transfer register, and in accordance with said second data transfer information, controls said second data transfer.

10. A method of controlling a storage control apparatus according to claim 9, wherein:
said data transfer control unit comprises a plurality of said data buffers and a plurality of said data transfer registers; and
when a second data transfer based on second data transfer information is controlled while a first data transfer based on first data transfer information is controlled, said data transfer control unit reads said second data transfer information from said second memory, writes said second data transfer information into a second data transfer register, and in accordance with the second data transfer information, controls said second data transfer before said first data transfer information and data to be transmitted and received by said first data transfer are read from a first data transfer register storing said first data transfer information and a first data buffer storing the data to be transmitted and received by said first data transfer and written in said second memory.

11. A method of controlling a storage control apparatus according to claim 9, wherein said data transfer is controlled in a unit of each data block obtained by dividing data to be transferred between said first storage control apparatus and said second control apparatus into at least one or more data.

12. A method of controlling a storage control apparatus according to claim 9, wherein said first storage control apparatus is connected to said second storage control apparatus in a communication enable state via at least one or more switches.

13. A method of controlling a storage control apparatus according to claim 9, wherein:
when said data input/output request relative to said second storage volume is received from said information processing apparatus, said data transfer information is written in said second memory; and
said data transfer control unit reads said data transfer information from said second memory, writes said data transfer information in said data transfer register, and in accordance with said read data transfer information, controls data transfer between said first memory and said second storage control apparatus.

14. A method of controlling a storage control apparatus according to claim 9, wherein:
when a data write request relative to said first storage volume and write data are received from said information processing apparatus, said input/output control unit writes said data transfer information in said second memory in order to write a copy of said write data into said second storage volume; and
said data transfer control unit reads said data transfer information from said second memory, writes said data transfer information into said data transfer register, and in accordance with said read data transfer information, controls transmission of said write data from said first memory to said second storage control apparatus.

15. A method of controlling a storage control apparatus according to claim 9, said storage control apparatus further comprising:
a channel control unit having a circuit board formed with said second memory, said input/output control unit and said data transfer control unit;
a cache memory unit having a circuit board formed with said first memory; and
a disk control unit for reading/writing data relative to said first storage volume,
wherein:
said first memory stores data to be transmitted and received at least between said first storage control apparatus and said information processing apparatus or said second storage control apparatus;
said input/output control unit writes data transfer information in said second memory, said data transfer information containing the storage location of data in said first memory and a storage location of data in said information processing apparatus or said second storage apparatus; and
said data transfer control unit controls data transfer between said first memory and said information processing apparatus or said second storage control apparatus via said data buffer in accordance with said data transfer information read from said second memory and written in said data transfer register.

* * * * *